US010445388B2

United States Patent
Chan et al.

(10) Patent No.: US 10,445,388 B2
(45) Date of Patent: Oct. 15, 2019

(54) SELECTION BIAS CORRECTION FOR PAID SEARCH IN MEDIA MIX MODELING

(71) Applicant: Google Inc., Mountain View, CA (US)

(72) Inventors: David Chan, Millburn, NJ (US); Yueqing Wang, San Francisco, CA (US); Aiyou Chen, Palo Alto, CA (US); James Koehler, Boulder, CO (US); Yuxue Jin, Short Hills, NJ (US); Michael Perry, San Francisco, CA (US); Yunting Sun, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 199 days.

(21) Appl. No.: 15/708,592

(22) Filed: Sep. 19, 2017

(65) Prior Publication Data

US 2019/0087497 A1 Mar. 21, 2019

(51) Int. Cl.
| | |
|---|---|
| G06F 17/30 | (2006.01) |
| G06F 16/9535 | (2019.01) |
| G06F 16/29 | (2019.01) |
| G06F 16/955 | (2019.01) |
| G06Q 30/02 | (2012.01) |

(52) U.S. Cl.
CPC .......... *G06F 16/9535* (2019.01); *G06F 16/29* (2019.01); *G06F 16/955* (2019.01); *G06Q 30/0201* (2013.01); *G06Q 30/0242* (2013.01); *G06Q 30/0243* (2013.01)

(58) Field of Classification Search
CPC .... G06F 16/9535; G06F 16/29; G06F 16/955; G06Q 30/0242; G06Q 30/0243
USPC .............. 707/709, 688, 724, 725, 728, 737; 705/14.41, 14.1
See application file for complete search history.

(56) References Cited

U.S. PATENT DOCUMENTS

| | | | | |
|---|---|---|---|---|
| 9,996,626 | B1 * | 6/2018 | Bailey ....................... | G06F 7/00 |
| 10,036,638 | B2 * | 7/2018 | D'Alberto ............. | H04W 4/029 |
| 2004/0243461 | A1 * | 12/2004 | Riggle ................. | G06Q 10/063 |
| | | | | 703/2 |
| 2006/0041480 | A1 * | 2/2006 | Briggs ................... | G06Q 30/02 |
| | | | | 705/14.41 |
| 2007/0067267 | A1 * | 3/2007 | Ives ..................... | G06F 16/951 |
| 2015/0294014 | A1 * | 10/2015 | Reznik ................. | G06F 16/951 |
| | | | | 707/706 |
| 2016/0050129 | A1 | 2/2016 | Hoyne | |

OTHER PUBLICATIONS

"International Search Report", PCT/US2018/037932, dated Sep. 3, 2018, pp. 1-92.

* cited by examiner

*Primary Examiner* — Dangelino N Gortayo
(74) *Attorney, Agent, or Firm* — Foley & Lardner LLP

(57) ABSTRACT

Systems, methods, and computer-readable storage media that may be used to generate causal models and calculate a selection bias in mixed media. In some embodiments, the selection bias calculation is in search sponsored content in the context of mixed media modeling. In some embodiments, a method for search bias correction is based on the back-door criterion from causal inference.

20 Claims, 15 Drawing Sheets

SELECTION BIAS CORRECTION FOR PAID SEARCH IN MEDIA MIX MODELING

BACKGROUND

Evaluating performance metrics is a fundamental problem when there are multiple media channels and changes are needed in the use of multiple media channels to maximize one or more performance metric. Many entities use multiple media channels to maximize their performance metrics. Media mix modeling ("MMM") is an analytical approach (e.g., multivariate regression) using observational data to estimate and forecast the impact of various media mix strategies on performance metrics. One performance metric may be return on ad spend ("ROAS").

SUMMARY

One embodiment relates to a method using one or more processors for eliminating bias in media mix modeling. The method comprises identifying a first Uniform Resource Locator ("URL") associated with an incremental value change of a first metric, identifying a plurality of URLs associated with the first URL, receiving search query data comprising queries from a target geographical region in a first time window, partitioning the received search query data to a plurality of groups comprising a first group associated with the first URL, a second group associated with one or more of the plurality of URLs, and a third group associated with a business category, each respective association defined by equaling or exceeding a predetermined threshold of a second metric, generating a plurality of search query subsets based on the plurality of groups, generating an additive regression model based on a causal diagram that comprises as identification of a causal effect associated with the incremental value change of the first metric, and calculating a bias corrected estimate of the incremental value change of the first metric by fitting the additive regression model to the plurality of search query subsets.

In some embodiments, the method further comprises determining a first search term of the received search query data is associated with search results comprising the first URL, determining a second search term of the received search query data is associated with search results comprising one of the one or more plurality of URLs, and partitioning the first search term to the first group and the second search term to the second group. In some embodiments, the method further comprises determining a first time window, calculating a first number of searches in the first group, a second number of searches in the second group, and a third number of searches in the third group, calculating a total search volume of the first group, the second group, and the third group, and determining at least one of the first number of searches in the first group, the second number of searches in the second group, and the third number of searches in the third group compared to the total search volume exceeds a second predetermined threshold. In some embodiments, the method further comprises determining a number of search queries in the received search query data exceeds a predetermined search query threshold and generating the additive regression model using a 3-dimension full tensor product smooth consequent to determining the number of search queries in the received search query data exceeds the predetermined threshold. In some embodiments, the method further comprises reformulating the additive regression model using a restricted maximum likelihood ("REML") algorithm.

Some embodiments relate to a system comprising at least one computing device operably coupled to at least one memory and configured to execute instructions corresponding to one or more of the methods above.

Some embodiments relate to a non-transitory computer-readable media having computer-executable instructions embodied therein that, when executed by one or more processors of a computing system, cause the computing system to perform a process corresponding to one or more of the methods described above Some embodiments relate to a non-transitory computer-readable media having computer-executable instructions embodied therein that, when executed by one or more processors of a computing system, cause the computing system to perform a process comprising identifying a first content item, determining a media mix environment is associated with the first content item, determining a causal relationship between a first media of the media mix environment and a second media of the media mix environment, identifying a first Uniform Resource Locator (URL) associated with the first content item, identifying a plurality of URLs associated with the first URL, receiving search query data comprising queries from a target geographical region in a first time window, partitioning the received search query data to a plurality of groups comprising a first group associated with the first URL, a second group associated with one or more of the plurality of URLs, and a third group associated with a business category, each respective association defined by equaling or exceeding a predetermined threshold of a second metric, generating a plurality of search query subsets based on the plurality of groups, calculating a bias factor between the first media of the media mix environment and the second media of the media mix environment based on the causal relationship, generating an additive regression model using the bias factor between the first media of the media mix environment and the second media of the media mix environment, and calculating a bias corrected estimate of the incremental value change of the first metric by fitting the additive regression model to the plurality of search query subsets.

In some embodiments, the first metric comprises a return on advertising spend. In some embodiments, the search query data comprises all queries selected using at least one of a criteria selected from a group comprising a geographical target region, a time window, and a user demographic.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
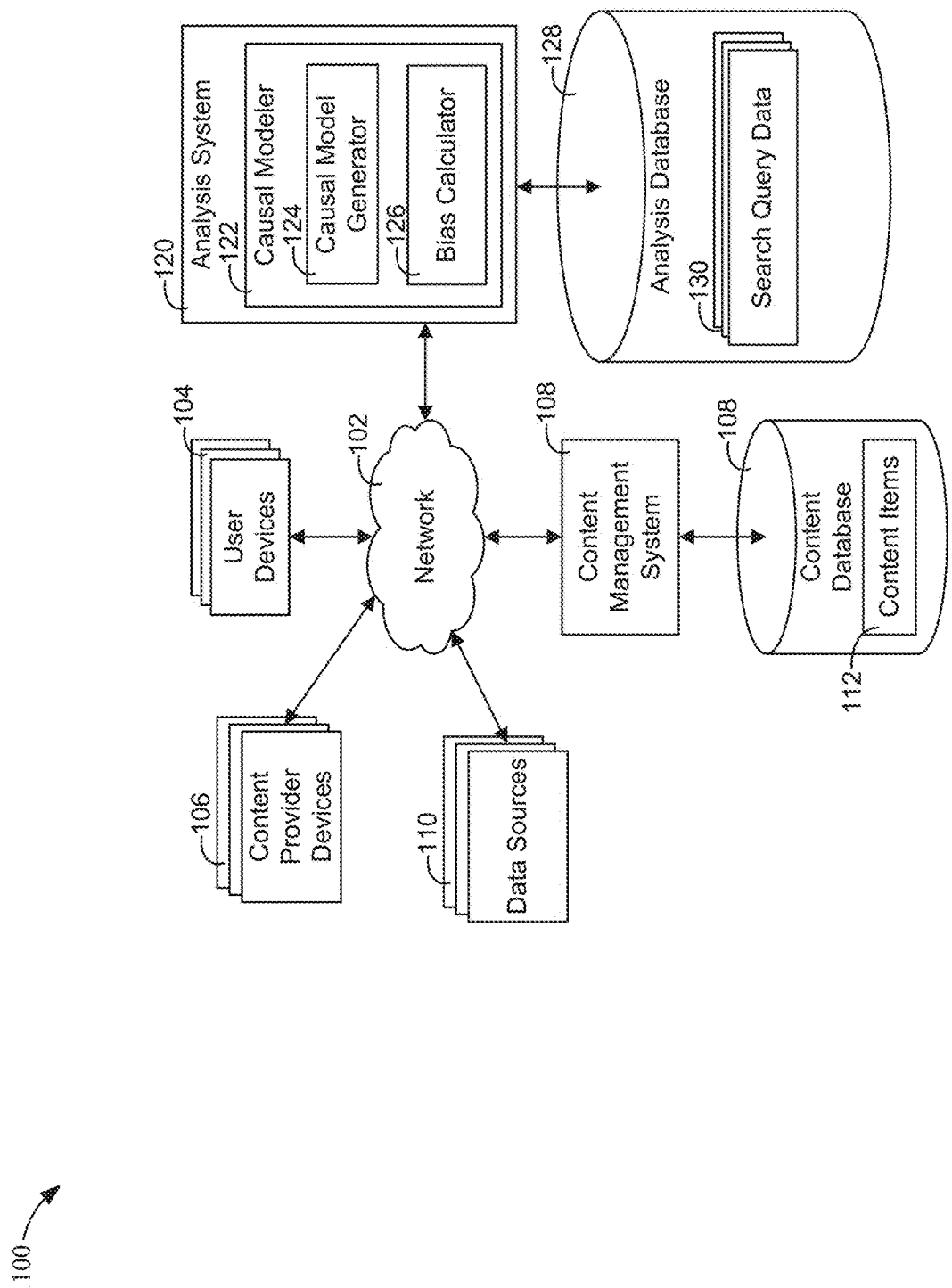
FIG. 1 is a block diagram of an analysis system including a Causal modeler and associated environment according to an example embodiment.

Media mix modeling (MMM) is an analytical approach using multivariate regression with observational data to estimate the mix of various media mix strategies on performance metrics. Selection bias is one limitation in sponsored content targeting for correctly evaluating the ROAS because an underlying interest from the target population may be driving the sponsored content spend and the sales. This can lead to overestimates of ROAS.

In some embodiments, causal diagrams of the content item search environment are used to create a search bias correction in media mix modeling. Once a causal diagram is known, a method of bias correction can be derived. In one embodiment, Pearl's causal theory is used to create an estimate of a causal effect of two variables. A back-door criterion of the causal effect can be used to determine whether the causal effect is identifiable from the data. A set of variables can satisfy the back-door criterion relative to an ordered pair of variables when certain conditions are met. If the back-door criterion is met, the causal effect is identifiable and given by a specific formula.

One embodiment of a method for evaluating the ROAS comprises collecting the search query data and fitting a model to the search query data. Since the volumes of relevant search queries may be very large, the search queries may be summarized so they are more adapted to model fitting. Summarizing the search queries may comprise, identifying the content provider's website and its top competitors' websites, collecting all queries over a target region in a given time window, and partitioning the query set into three groups according to the destination URLs that appear for each query. Destination URLs may be classified into groups such as a) belongs to the content provider, b) belongs to top competitors, c) does not belong to either, but belongs to the business category, and d) does not belong to the business category. The number of impressions may be used to classify the URLs into groups resulting in three subsets of queries for target-favoring queries, competitor favoring queries, and general interest queries. Pre-determined thresholds may be used to establish the thresholds for the segmentation procedure into subsets of queries. The models generated from the causal diagrams are applied to the subsets of queries to generate the ROAS. In some embodiments, model stability is checked by using a non-parametric model fitting procedure.

Referring generally to the Figures, various illustrative systems and methods are provided that can be used to eliminate bias in Media Mix Modeling (MMM), in some embodiments. Various limitations of MMM are recognized, for example, data collection, selection bias, long-term effects, seasonality, and funnel effects. In some embodiments, a typical MMM is described as a regression model, where the dependent variable is a key performance indicator (KPI), i.e., performance metric, and independent variables include various media inputs (e.g. spend levels, impressions or GRPs), product price, economic factors, competitors' activities, etc. A performance metric may be measured in a particular area on a daily, weekly or monthly basis. In the causal estimates of the set of media effects; causal inference is known to be notoriously hard with observational data. One of the major challenges to valid causal inference in MMM is selection bias due to sponsored content targeting. Sponsored content targeting is common across many different media channels, but is particularly acute in digital channels. Selection bias from sponsored content targeting arises when an underlying interest or demand from the target population is driving both the sponsored content spend and the sales.

Content item producers may spend more when there is stronger demand for their product. As a result, a naive regression which measures the change in sales relative to the change in sponsored content spend may lead to over-estimates of ROAS. A heuristic explanation is that the change in sales could be caused by a change in either consumer demand or sponsored content spend or both, while the naive method ignores the change in consumer demand. In some embodiments, causal diagrams of the content item are used to derive a statistically principled method for content item search bias correction (SBC) in MMM. In some embodiments, this is based on the back-door criterion of causal inference.

Referring now to FIG. 1, a block diagram of an analysis system 120 and associated environment 100 is shown according to an illustrative embodiment. One or more user devices 104 may be used by a user to perform various actions and/or access various types of content, some of which may be provided over a network 102 (e.g., the Internet, LAN, WAN, etc.). A "user" or "entity" used herein may refer to an individual operating user devices 104, interacting with resources or content items via the user devices 104, etc. The user devices 104 may be used to access websites (e.g., using an internet browser), media files, and/or any other types of content. A content management system 108 may be configured to select content for display to users within resources (e.g., webpages, applications, etc.) and to provide content items to the user devices 104 over the network 102 for display within the resources. The content from which the content management system 108 selects items may be provided by one or more content providers via the network 102 using one or more content provider devices 106.

In some embodiments, the content management system 108 may select content items from content providers to be displayed on the user devices 104. In such embodiments, the content management system 108 may determine content to be published in one or more content interfaces of resources (e.g., webpages, applications, etc.). The content management system 108 can be configured to conduct a content auction among third-party content providers to determine which third-party content is to be provided to the user device 104. The auction winner can be determined based on bid amounts and a quality score (i.e., a measure of how likely the user of the user device 104 is to click on the content). In some implementations, the content management system 108 allows content providers to create content campaigns. A campaign can include any number of parameters, such as a minimum and maximum bid amount, a target bid amount, and/or one or more budget amounts (e.g., a daily budget, a weekly budget, a total budget, etc.).

The analysis system 120 can include one or more processors (e.g., any general purpose or special purpose processor), and can include and/or be operably coupled to one or more transitory and/or non-transitory storage mediums and/or memory devices (e.g., any computer-readable storage media, such as a magnetic storage, optical storage, flash storage, RAM, etc.). In various implementations, the analysis system 120 and the content management system 108 can be implemented as separate systems or integrated within a single system (e.g., the content management system 108 can be configured to incorporate some or all of the functions/capabilities of the analysis system 120).

The analysis system 120 can be communicably and operatively coupled to the analysis database 128. The analysis system 120 can be configured to query the analysis database 128 for information and store information in the analysis database 128. In various implementations, the analysis database 128 includes various transitory and/or non-transitory storage mediums. The storage mediums may include but are not limited to magnetic storage, optical storage, flash storage, RAM, etc. The database 128 and/or the analysis system 120 can use various APIs to perform database functions (i.e., managing data stored in the database 128). The APIs can be but are not limited to SQL, ODBC, JDBC, etc.

Analysis system 120 can be configured to communicate with any device or system shown in environment 100 via network 102. The analysis system 120 can be configured to receive information from the network 102. The information may include browsing histories, cookie logs, television advertising data, printed publication advertising data, radio advertising data, and/or online advertising activity data. The analysis system 120 can be configured to receive and/or collect the interactions that the user devices 104 have on the network 102. This information may be stored as search query data 130.

Data sources 110 may be data collectors or content providers that can provide advertising data to the analysis system 120. The data may be content input (e.g., advertising spend) and response (e.g., revenue) for particular media channels (e.g., television, Internet advertising, radio, billboards, printed publications) at one or more points in time. The content input may include spending on television advertisements, billboard advertisements, Internet advertising (e.g., search content item spend or display content item spend), etc. Data sources 110 may be also be various data aggregating systems and/or entities that collect advertising data. The analysis system 120 can receive search query data 130 from the data sources 110 via the network 102.

The analysis system 120 can be configured to send information and/or notifications relating to various metrics or models it determines, generates, or fits to the content provider devices 106. This may allow a user of one of the content provider devices 106 to review the various metrics or models which the analysis system 120 determines. Further, the analysis system 120 can use the various metrics to identify opportune times to make contact with a user or appropriate amounts (e.g., an optimal mixed media spend) to spend on various media channels (e.g., television advertising, Internet advertising, radio advertising, etc.). The analysis system 120 can cause a message to be sent to the content management system 108 and/or the content provider devices 106 indicating that the content management system 108 should make contact with a certain user at a certain time and/or a content campaign operate with certain parameters. This may cause the content management system 108 to manage content auctions accordingly and/or identify various system loads. The analysis system 120 can be configured to analyze search query data to identify bias and update the amount allocated to each component of the mixed media spend to compensate.

The analysis system 120 may include one or more modules (i.e., computer-readable instructions executable by a processor) and/or circuits (i.e., ASICs, Processor Memory combinations, logic circuits, etc.) configured to perform various functions of the analysis system 120. In some implementations, the modules may be or include a causal modeler 122 which is shown to include a causal model generator 124 and a bias calculator 126.

The causal modeler 122, i.e., the causal model generator 124 and the bias calculator 126, can be configured to generate the various models and data structures stored in the analysis database 128. For example, the bias calculator 126 can be configured to generate one or more bias calculations based on search query data 130. The search query data 130 may be data structures that indicate search queries by various geographic areas. In some embodiments, the search query data 130 may be data structures associated with certain demographics, particular software users, particular operating system users, particular internet service provider users, and the like. For example, the geographic areas could be states, cities, countries, or any other geographic area. The search bias calculators can be generated by the bias calculator 126 by grouping one or more smaller geographic regions, i.e., sub-regions, together. For example, the search query data 130 could be generated by grouping multiple states into East coast, West coast, and Midwest. Further, multiple cities within a particular state could be grouped together to form a predefined number of the search query data 130.

The bias calculator 126 can be configured to receive the search query data 130 for each of the categories, demographic groups, geographical sub-regions or the like that make up the search query data 130. For example, the bias calculator 126 can be configured to receive the search query data 130 for each of the cities of a state. The bias calculator 126 can be configured to receive data for the search query data 130 as a whole instead data specific to particular sub-categories, demographic groups, geographical sub-regions or the like. The received data that the bias calculator 126 receives can be data that analysis system 120 aggregates and/or data that the analysis system 120 receives from the data sources 110.

The search query data 130 may include sets of data that each include responses, content inputs, a content type, control variables, and/or a location identifier. The data may be for one or more points in time over an interval (e.g., data for each hour out of a day, data for each day out of a year, data for each month out of a decade, etc.) The content type may indicate a particular media channel of the set of data, for example, television, radio, Internet advertising, newspaper or magazine advertising, etc. The response may indicate particular amounts of revenue at particular times. In some embodiments, the response is number of conversions, number of sales, number of account registrations, etc. The content inputs may indicate particular amounts of advertising spending for the content type at particular times. The content inputs may further indicate a number of advertisements run. The search query data 130 may be time series data structures indicating amounts of content input, response, for various media channels over time.

The causal model generator 124 can be configured to generate a causal model based on the search query data 130 combined with one or more factors associated with a different media of the media mix. In some embodiments, the causal model generator 124 is configured to fit the causal model to the search query data and output one or more parameters to the bias calculator 126.

Figure 2:
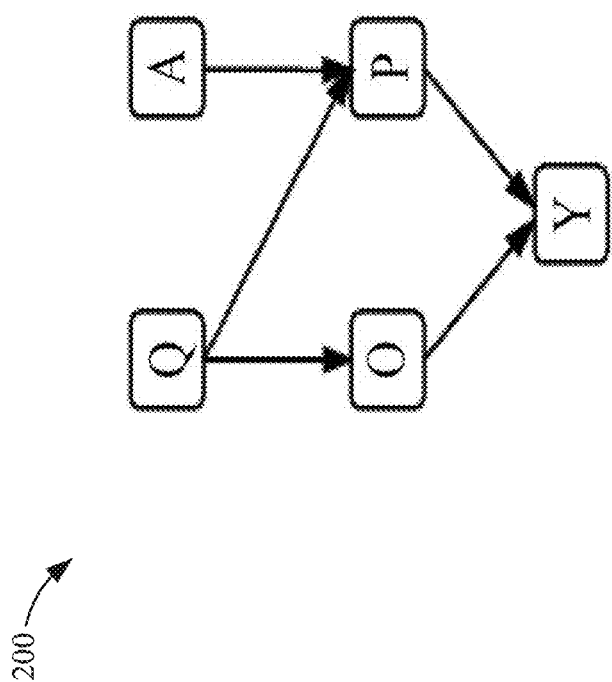
FIG. 2 is a block diagram of a causal diagram according to an example embodiment.

Referring to FIG. 2, a block diagram is shown of a causal diagram 200 according to an example embodiment. The Causal diagram 200 is a representation of a causal diagram for content at a query level, where Q stands for a query, A stands for auction factors, O stands for organic search results, P indicates a paid search impression, and Y stands for the sales value. A causal diagram may be a directed acyclic graph (DAG), representing causal relationships between variables in a causal model. It comprises a set of variables, represented as nodes of the graph, defined as being within the scope of the model. An arrow from a first node to a second node represents causal influence from the first node to the second node. All other factors being equal, a change in the first node may cause changes in the second node. In some embodiments, estimation methodology using the causal diagram is based on Pearl's causal theory.

In one example, a simplified causal diagram about how search content affect sales is as follows. Suppose that a user submits a search query (e.g., flower delivery) to a search engine (e.g., www.google.com). There may be two consequences: 1) the user would see a list of URLs plus a few lines of description in the main body of the search pages (i.e., organic results which are ranked by the search engine based on their relevance to the search query; 2) if the search query matches certain keywords that are targeted, then the content items to be shown on the page will be chosen by auction. The auction considers various factors including bid, content item quality and content provider homepage quality. The user may click on some URLs from organic results or click on the content items, and then land on some flower delivery websites to make an order.

Referring back to FIG. 2, in one example embodiment, A represents the auction factors, Q is the search query controlled by a search user, P indicates the presence of a paid search impression, and O is organic search results. Given the query Q, O is determined by the search engine (plus user information if it is personalized search) and P is determined by the search engine and other parties in the auction. Let Y be the sales value. The causal path goes as follows: 1) Q has two consequences P and O; 2) P is affected by both Q and A; 3) Y is affected by both O and P. Therefore, intervention on P has a direct effect on Y, while intervention on A does not have an effect on Y unless it causes changes in P. The causal diagram can be described by the directed acyclic graph shown in FIG. 2. In the example embodiment illustrated in FIG. 2, given a search query Q, organic search content does not depend on paid search content—there is no arrow between P and O.

In observational studies like MMM, measurements are often only possible for some of the nodes in the causal diagram. In order to measure the causal effect of content item spend on sales, it is important to first understand the underlying causal diagram, and then judge whether the causal effect is identifiable from the partially observed data.

Pearl's Causal Framework

In some embodiments, Pearl's description of causal diagrams as models of intervention are important to understanding the concept of causal identifiability. Each child Xi in a causal diagram represents a relationship $X_i = f_i(pa_i, \in_i)$ where $f_i$ is a function, $pa_i$ is the set of parents of $X_i$ and $\in_i$ is an arbitrarily y determined random disturbance that must be independent of all other variables and disturbances in the model.

In some embodiments, given two variables, X and Y, the causal effect of X on Y, denoted Pr(y|x), is a function from X to the space of probability distributions on Y. For each realization x of X, Pr(y|x) gives the probability of Y=y induced by deleting from the model represented in FIG. 2 the equation corresponding to X and forcing X to equal x in the remaining equations. The x notation indicates intervene by setting X to x.

In some embodiments, the causal effect of X on Y is identifiable if the quantity Pr(y|x) can be computed uniquely from any positive probability of the observed variables that is compatible with the diagram.

In some embodiments, identifiability means that, given an arbitrarily large sample from the joint distribution described by the causal diagram, the causal effect Pr(y|x) can be determined.

In some embodiments, a path between two nodes on a causal diagram is said to be d-separated or blocked by a subset of variables (nodes) Z if and only if either of the two conditions is satisfied: 1) the path contains a chain i→m→j or a fork i←m→j such that m E Z, or 2) the path contains an inverted fork i→m←j such that m/∈ Z and such that no descendant of m belongs to Z.

In some embodiments, the back-door criterion can be stated as follows, given a causal diagram, a set of variables Z satisfies the back-door criterion relative to an ordered pair of variables (X, Y) in the diagram if: 1) no node in Z is a descendant of X; and 2) Z blocks every path between X and Y that contains an arrow into X. Condition 1) in the definition of the back-door criterion rules out covariates which are consequences of X, and condition 2) makes sure that Z contains the right set of confounding factors. The back-door adjustment theorem (i.e., Pearl back-door adjustment theorem) says that if a set of variables Z satisfies the back-door criterion relative to (X,Y), then the causal effect of X on Y is identifiable and the causal effect of X on Y is given by the formula:

$$Pr(Y | \hat{x}) = \sum_z Pr(Y | x, z) Pr(z)$$

In other words, in some embodiments, Z makes it possible to estimate the causal effect of X on Y.

In the example described by FIG. 2, since there is only one path from P to Y that has an arrow into P, i.e., P←Q→O→Y, the node Q (search query) meets the back-door criterion for the causal effect of node P on Y. In some embodiments, this makes it possible to estimate the causal impact of search content item given proper query level data.

Pearl's framework has the same goal as and can be translated to the counterfactual framework defined in the Neyman-Rubin causal model, but it also provides formal semantics to help visualize causal relationships. In some embodiments, the back-door criterion provides a convenient tool for us to identify the proper set of covariates which satisfies the so-called ignorability assumption in order to identify causal effects from observational data. In some embodiments, a general identification condition for causal effects is used. In some embodiments, the methodology of selection bias correction for search content items is based on the back-door criterion.

Figure 3:
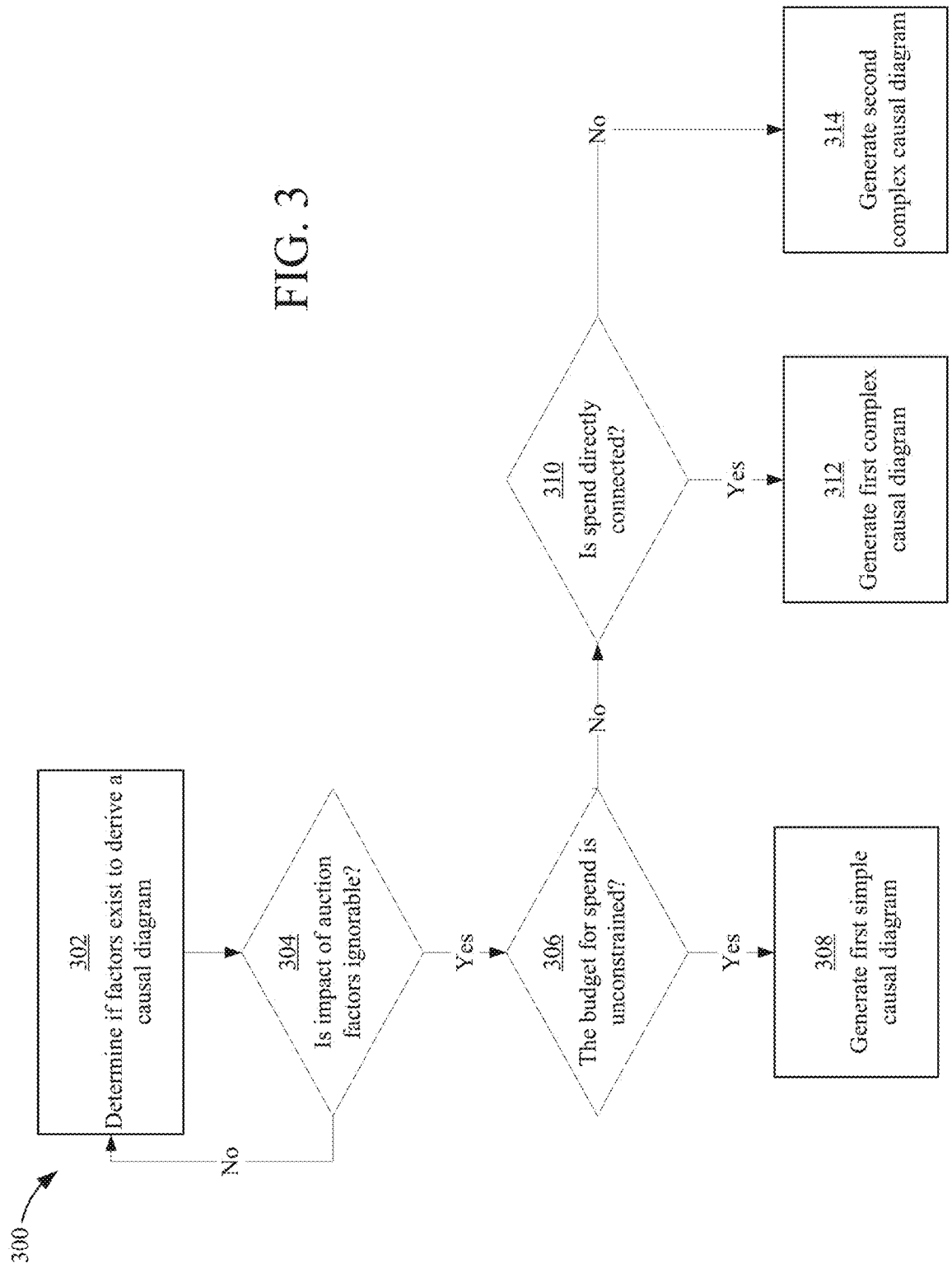
FIG. 3 is a flow chart of a process for generating a causal diagram according to an example embodiment.

Referring to FIG. 3, a flow chart 300 of a process for generating a causal diagram, is illustrated according to an example embodiment. In brief, the process comprises determining if factors exist to derive a causal diagram and determining if any impact of auction factors is ignorable. If the impact of auction factors is not ignorable, then the process returns to determining if factors exist to derive a causal diagram. If the impact of auction factors are ignorable, the process determines if the budget of spend is unconstrained. If the budget for spend is unconstrained, then the process continues generating a first simple causal diagram. If the budget for spend is not unconstrained, the process comprises determining if the spend is directly connected to a factor of the causal diagram. If the spend is not directly connected, the process continues generating a first complex causal diagram. If the spend is not directly connected, the process continues generating a second complex causal diagram.

A determination is made if factors exist to derive a causal diagram at 302. In some embodiments, a major factor which prevents the obtaining unbiased estimates of $\beta_1$ by ordinary least squares (OLS), is the correlation between $X_t$ and $\epsilon_t$. This can be caused by the endogeneity problem in econometrics. By rewriting $\epsilon = \gamma X + +\eta$, with $\gamma = cov(X, \epsilon)/var(X)$ and $\eta = \epsilon - \gamma X$, the following is derived:

$$Y = \beta_0 + (\beta_1 + \gamma)X + \eta.$$

A further factor and an important contributor to sales is the direct impact from underlying consumer demand, denoted as $_0$, which can be affected by economic factors and seasonality. Organic search results may contribute directly to sales, denoted as $_1$. Due to content items targeting, factor to determine include organic search content and paid search content are typically positively correlated, resulting in cov $(X, \epsilon_1) > 0$. A main effect can be modeled as in model 4.1.

A determination is made if the impact of auction factors is ignorable at 304. In some embodiments, a user submits a search query. There are typically two consequences: 1) the user would see a list of URLs plus a few lines of description in the main body of the search pages, called organic results, which are ranked by the search engine based on their relevance to the search query; 2) if the search query matches certain keywords targeted by a set of content providers, then the content items to be shown on the page will be chosen by auction. The auction considers various factors including bid, content item quality and content provider homepage quality. The user may click on some URLs from organic results or click on the ads, and then land on some relevant websites. The auction considers various factors including bid, content item quality and content provider homepage quality. The user may click on some URLs from organic results or click on the ads, and then land on some relevant content specific websites to make an order.

A determination is made if the budget for spend is unconstrained at 306. In some embodiments search content items are determined by two parts: search queries are available to match keywords targeted by the content provider and the content provider has the budget to participate in the auction for search content items. A sponsored content providers budget can be evaluated to see if the budget is unconstrained for search content items specifically or if there are conditional or predetermined thresholds of volumes of relevant search queries. Larger or unconditional budgets allows for the consideration of the impact of consumer demand on auction factors such as content item provider's bids and competitors' actions in auction to be ignorable.

A determination is made if spend is directly connected to a factor of the causal diagram at 310. In some embodiments, organic search results may contribute directly to sales. In some embodiments, due to content items targeting, organic search content and paid search content are positively correlated, resulting in a connection to a factor of the causal diagram.

A first simple causal diagram is generated at 308. In some embodiments, a simple causal diagram is generated when a determination is made that that the budget for spend is unconstrained. In some embodiments, a budget over a predetermined threshold amount is treated as unconstrained. In an example embodiment of the simple scenario, search advertising is assumed to be the only advertising channel, and the contribution of other media channels on sales, if any, is ignorable. In some embodiments, Xt is set to be the search content item spend for a particular product sold by an content provider at the tth time window and Yt is set as sales for the product during the t-th time window. A determination can be made that the impact of search content items on sales occurs within the same period as the content item exposure.

A first complex causal diagram is generated at 312. If search content item spend is not directly correlated with other media spend, but is mostly determined by the availability of search content item inventory through consumers' relevant search query volume, then the causal diagram reduces to FIG. 6. This holds approximately for many content providers, for example when content providers use bid optimization instead of specific budget constraint to control search content item spend. In some embodiments, under this approximation, non-search contributors as well as their potential lag effects do not affect the identifiability of $\beta 1$. In some embodiments cases are considered where search content providing is not the only channel that may affect sales significantly. In some embodiments, X2 denotes all non-search content item contributors, e.g. traditional media channels and non-search digital channels, which may directly affect sales. Non-search contributors may also trigger consumers to search more online for the product (i.e. a funnel effect). Content providers may want to plan budgets for both search content items and other media channels.

A second complex causal diagram is generated at 314. In some embodiments, the second complex causal diagram can be generated if the first complex causal diagram can be reduced because spend is not directly correlated with other media spend, but is mostly determined by the availability of search content inventory. If search content item spend is not directly correlated with other media spend, but is mostly determined by the availability of search content item inventory through consumers' relevant search query volume, then the causal diagram reduces to FIG. 6. This holds approximately for many content providers, for example when content providers use bid optimization instead of specific budget constraint to control search content item spend. Under this approximation, non-search contributors as well as their potential lag effects do not affect the identifiability of $\beta 1$.

Figure 4:
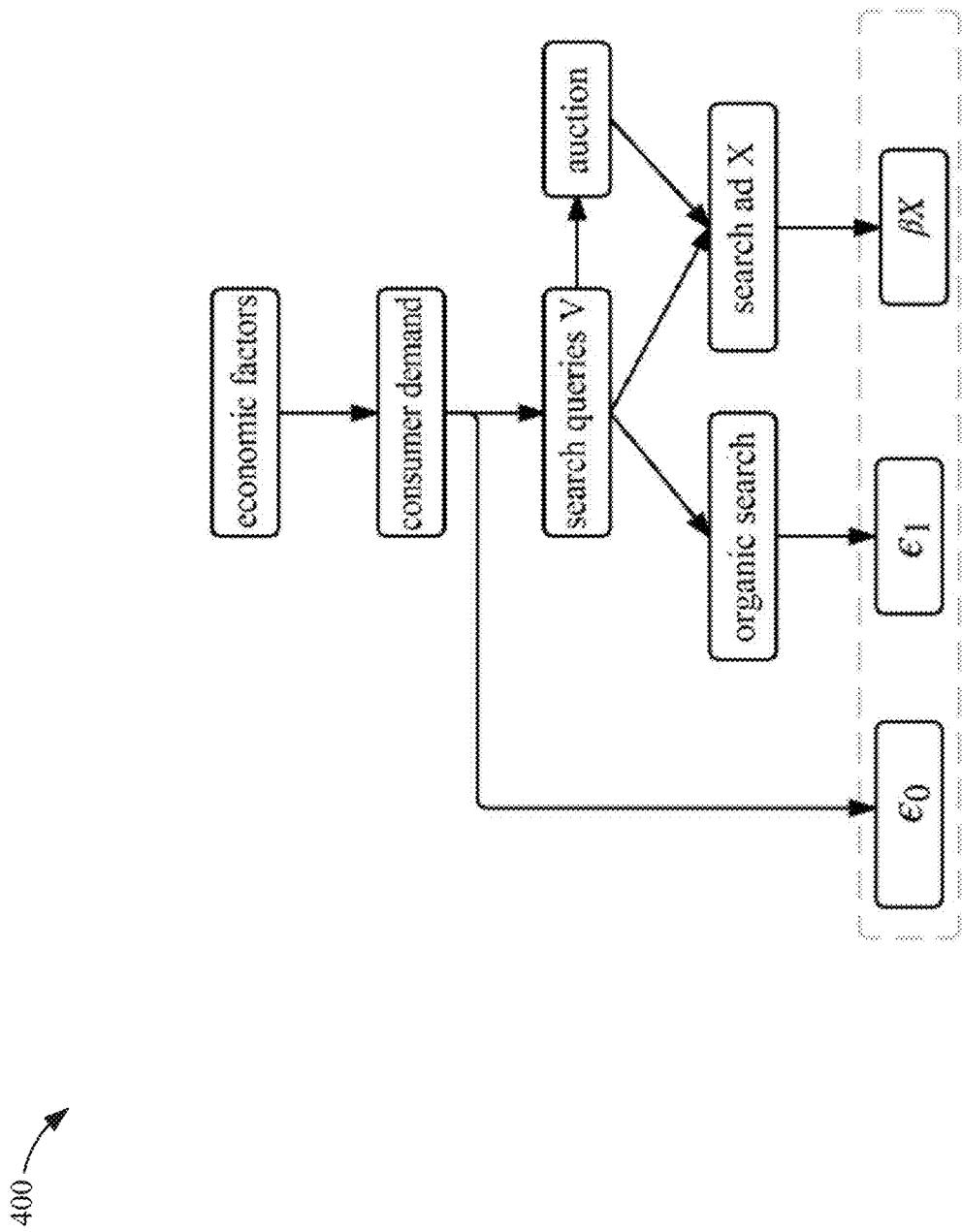
FIG. 4 is a block diagram of a simple causal diagram according to an example embodiment.
Figure 5:
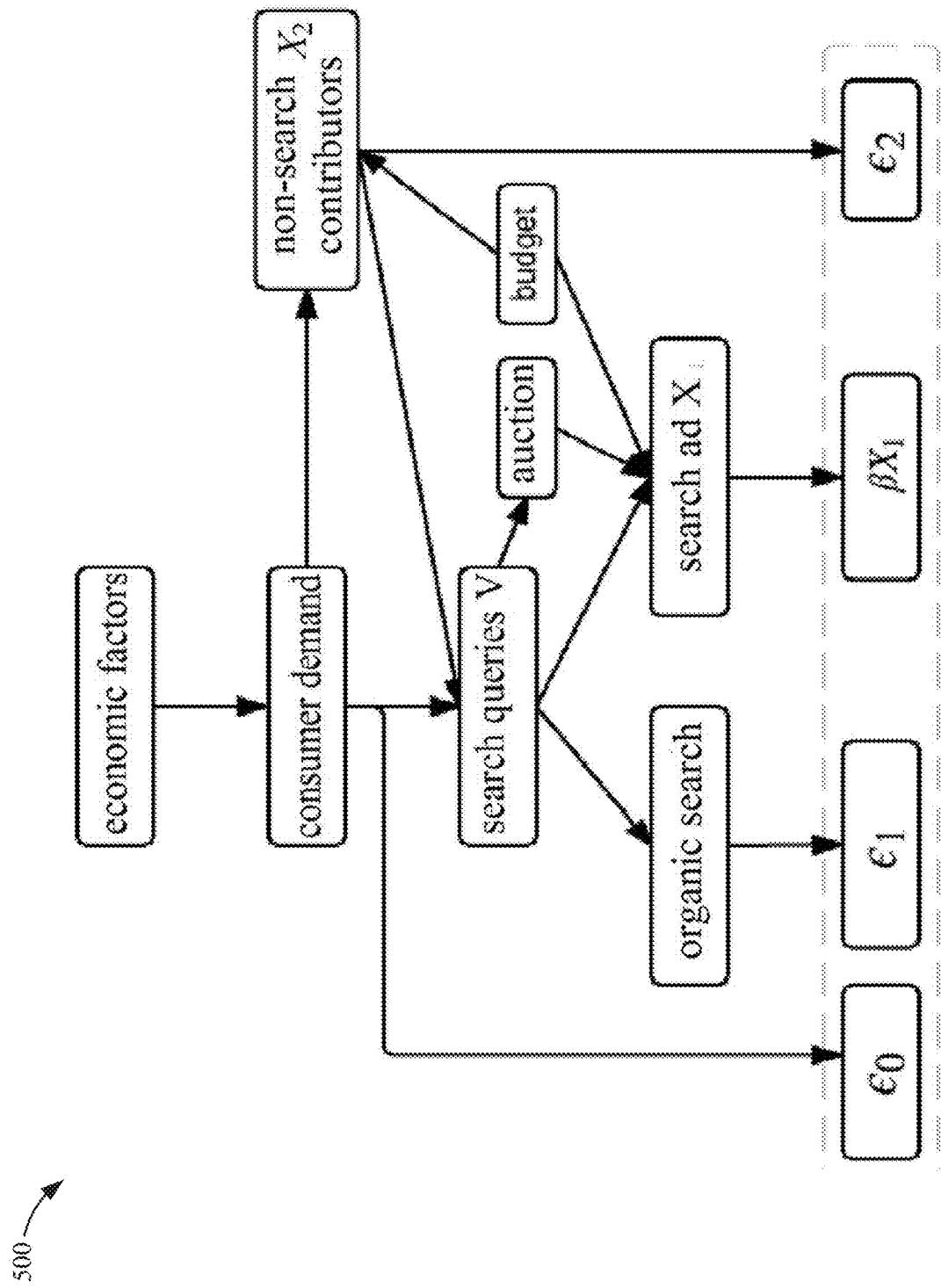
FIG. 5 is a block diagram of a complex causal diagram according to an example embodiment.
Figure 6:
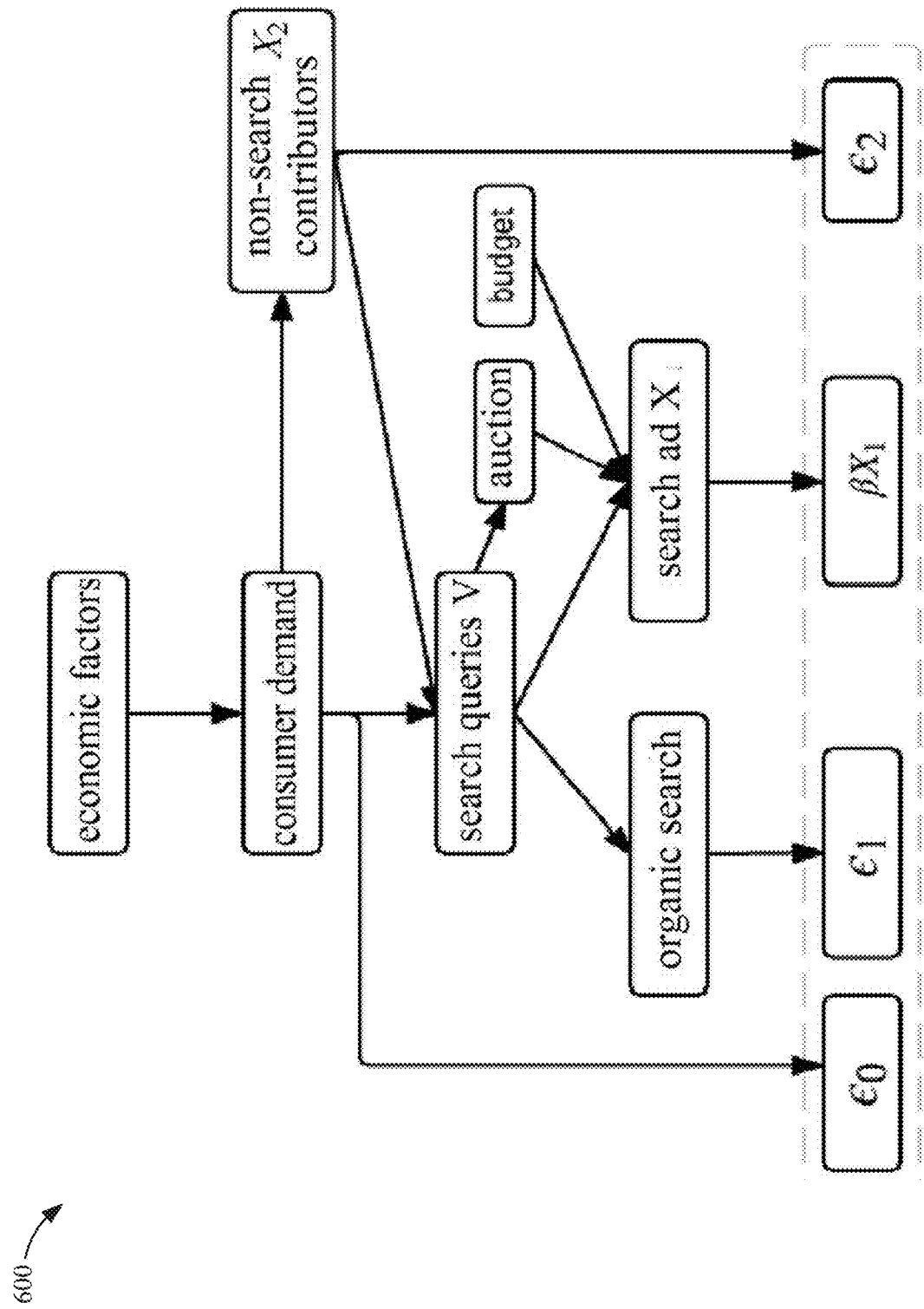
FIG. 6 is a block diagram of a complex causal diagram with some simplifying assumptions according to an example embodiment.

Referring to FIG. 4, a block diagram is shown of a simple causal diagram 400 according to an example embodiment. Referring to FIG. 5, a block diagram 500 is shown of a complex causal diagram according to an example embodiment. Referring to FIG. 6, a block diagram 600 is shown of a complex causal diagram with some simplifying assumptions according to an example embodiment.

Referring again to FIG. 4, this causal diagram represents a simple case where search content item is the only media channel that a content provider has invested. In some embodiments, the back-door criterion to derive the method of bias correction for the corresponding causal diagram is used. In some embodiments, using the simple causal diagram 400, search advertising is assumed to be the only advertising channel, and the contribution of other media channels on sales, if any, is ignorable. If Xt are the search content item spend for a particular product sold by a content provider at the t-th time window and Yt be sales for the product during the t-th time window, it can be assumed that the impact of search content items on sales occurs within the same period as the content item exposure.

In some embodiments, the model below is used:

$$Y_t = \beta_0 + \beta_1 X_t + \in t \qquad (4.1)$$

where the parameter of interest is $\beta_1$, measuring the expected incremental value of one unit change in search content item spend Xt but conditional on no change in t. Here $\beta_1$ is called the ROAS for search ads. That is, $\beta_1 X_t$ measures the causal impact of search content items on sales, and t represents other impact on sales (with the mean absorbed by the intercept $\beta_0$) which are not explained by Xt.

In some embodiments, a factor which prevents the obtaining of unbiased estimates of $\beta_1$ by ordinary least squares (OLS), is the correlation between Xt and t. This is called the endogeneity problem in econometrics. By rewriting $\in = \gamma X + \eta$, with $\gamma = \text{cov}(X,\in)/\text{var}(X)$ and, $\eta = \in - \gamma X$, the result of $Y = \beta_0 + (\beta_1 + \gamma)X + \eta$ is created. It is easy to verify that cov$(X,\eta) = 0$ and thus the naive estimate $\hat{\beta}_1$ through OLS has expectation $\beta_1 + \gamma$ instead of $\beta_1$. In some embodiments, to obtain an unbiased estimate of $\beta_1$, it is critical to understand what $\in$ consists of. An important contributor to sales is the direct impact from underlying consumer demand, denoted as $\in_0$, which can be affected by economic factors and seasonality. Organic search results may contribute directly to sales, denoted as $\in_1$. Due to content items targeting, organic search content and paid search content are typically positively correlated, resulting in cov$(X,\in_1) > 0$. In some embodiments, the main effect is modeled as in FIG. 4. It is often expected that cov$(X,\in_0) > 0$ and thus cov$(X,\in) > 0$ if $\in = \in_0 + \in_1$, which explains the phenomenon of over-estimation by the naive regression.

In some embodiments, let V be the sufficient statistics to summarize the volumes of relevant search queries that have potential impact on the sales of the product. Since different queries may have a different effect on sales, V is measured as a multi-dimensional time series. When V is measured accurately, based on the search content items mechanism it is reasonable to assume that $$\in_1 \perp X | V \qquad (4.2)$$

i.e. conditional on the relevant search queries, search content item spend is independent of potential organic search impact.

In some embodiments, search content items are determined by two parts: search queries are available to match keywords targeted by the content provider and the content provider has the budget to participate in the auction for search content items. To derive a working example causal diagram, two simple and explicit assumptions are made as follows:
(a) the content provider's budget for search content items is unconstrained
(b) conditional on volumes of relevant search queries, the impact of consumer demand on auction factors such as the content provider's bid and competitors' actions is ignorable In some embodiments, under these assumptions, the causal diagram can be described as in FIG. 4. The diagram implicitly assumes both $$\in_1 \perp X | V \text{ and } \in_0 \perp X | V.$$

Theorem 1. In some embodiments, assume that the causal diagram in FIG. 4 for paid search holds. If X and V are not perfectly correlated, then under regularity conditions for semiparametric models, search ad ROAS, i.e. $\beta_1$ in FIG. 4 can be estimated consistently by fitting the additive regression model below:

$$Y = \beta_0 + \beta_1 X + f(V) + \eta \qquad (4.3)$$

where $f(\bullet)$ is an unknown function and $\eta$ is the residual, uncorrelated with X and $f(V)$. For example, there are four paths from search content item spend X to sales that contains an arrow into search content item as shown in FIG. 4: $X \leftarrow V \rightarrow \in_1$, $X \leftarrow V \leftarrow$ consumer demand $\rightarrow \in_0$, $X \leftarrow V \leftarrow$ consumer demand $\rightarrow \in_0$, X<-auction<-V->organic search->epsilon_1 and X<-auction<-V<-consumer demand->epsilon_0. By definition, V satisfies the back-door criterion relative to search content item and sales. According to the back-door adjustment theorem, the causal effect of X on Y is identifiable by (Y,X,V). Let $f(v) = E(\in|V=v)$ and $\eta = \in - E(\in|V)$. Now according to model, 4.1, the average causal effect can be identified from conditional expectation:

$$E(Y|X,V) = \beta_0 + \beta_1 X + E(\in|X,V).$$

Due to the conditional independence $(\in_0, \in_1) \perp X | V$ assumed by the causal diagram, the following is derived:

$$E(\in|X,V) = E(\in 51 V).$$

then $$E(Y|X,V) = \beta_0 + \beta_1 X + f(V).$$

By the identifiability theorem of additive index models, both $f(\bullet)$ and $\beta_1$ are identifiable. Therefore, under regularity conditions, $\beta_1$ can be estimated consistently by the usual regression method which minimizes $\| Y - \beta_0 - \beta_1 X - f(V) \|$ with respect to parameters $(\beta_0, \beta_1, f)$ with proper regularization on $f$. When $f$ is known to be a linear function, the estimate of $\beta_1$ is not only consistent but unbiased.

In some embodiments, the model represented in FIG. 6 falls into a class of semiparametric models where the parameter of interest is $\beta_1$ and the nuisance parameters include $f(\bullet)$ and the residual distribution of $\eta$, assumed to have mean 0 and unknown finite variance. In some embodiments, even when the causal effect of search content items deviates from the simple linear form, the formulation of the model in FIG. 4 may still provide interesting insight regarding the average causal effect. The result can be extended naturally when the linear form $\beta_1 X$ is relaxed to an unknown function.

Assumptions (a) and (b) above are special cases where one expects the causal diagram in FIG. 4 to hold. In some embodiments, assumption (a) can be checked. The essential assumption required by the causal diagram is that search content item spend only depends on the volumes of relevant search queries and other factors can be treated as noise unaffected by consumer demand.

In some embodiments, the assumptions in Theorem 1 are sufficient but not necessary, for example, if search content item spend only depends on content item budget and is entirely randomized so that assumption (a) is violated, then model, 4.3, can still give a consistent estimate of search ad ROAS as defined in model, 4.1, There may exist scenarios where the causal diagram in FIG. 4 does not hold. For example, if a content provider has a relatively small budget, which correlates with consumer demand, and always uses up its budget by setting relatively high bid price, then there would be a direct edge from consumer demand to X. In this scenario, search ad ROAS is not identifiable.

Referring to FIG. 6, a block diagram 600 is shown of a complex causal diagram with some simplifying assumptions according to an example embodiment. The more complex causal diagram models cases where search advertising is not the only channel that may affect sales significantly. In some embodiments, X2 denotes all non-search content item contributors, e.g. traditional media channels and non-search digital channels, which may directly affect sales. Non-search contributors may also trigger consumers to search more online for the product (i.e. a funnel effect). Content providers might want to plan budgets for both search content items and other media channels. In some embodiments, FIG. 5 illustrates an example of causal diagram for such a scenario. As in the case above, this graph is a dramatic simplification. For example, it does not describe complexity such as historical content items may impact current sales (lag effect of non-search contributors), and it may ignore potentially weak links not shown on the diagram.

In some embodiments, if search content item spend is not directly correlated with other media spend, but is mostly determined by the availability of search content item inventory through consumers' relevant search query volume, then the causal diagram reduces the model represented in FIG. 6. This holds approximately for many content providers, for example when content providers use bid optimization instead of specific budget constraint to control search content item spend. Under this approximation, non-search contributors as well as their potential lag effects do not affect the identifiability of $\beta 1$.

In some embodiments, the simplified theory for the complex scenarios may be derived as in Theorem 2.

Theorem 2. (1) Assume that the causal diagram in FIG. 5 for search content items holds and that X2 has ignorable lag effect. The causal effect of paid search on sales is identifiable from observational data (X1, X2, V, Y). If X1 is not perfectly correlated with V and X2, then under regularity conditions, search ads ROAS $\beta 1$ defined in model, 4.1, can be estimated consistently by fitting the additive regression model below:

$$Y = \beta 0 + \beta 1 X 1 + f(V, X 2) + \eta \quad (4.4)$$

where $$f(v, x_2) = E(\in_0 | V = v, X_2 = x_2) + E(\in_1 | V = v) + E(\in_2 | X_2 = x_2)$$

and $\eta$ is the residual, uncorrelated with X1 and $f(V, X2)$.

Theorem 2. (2) If the causal diagram in FIG. 6 holds, then under regularity conditions, search ad ROAS $\beta 1$ defined in the model (4.1) can be estimated consistently by fitting the additive regression model below:

$$Y = \beta 0 + \beta 1 X 1 + f(V) + \eta \quad (4.5)$$

where $\beta 1$ is the parameter of interest and $f$ is an unknown function. That is, the estimation procedure is the same as for the simple scenario described earlier. In some embodiments, upon proof of (1), it may be verified by definition that (V,X2) satisfies the back-door criterion for X1→Y and thus makes the causal effect of X1 on Y identifiable. Next due to $\in_1 \perp X_1 | V$, $\in_2 \perp X_1 | X_2$ and $\in_0 \perp X_1 | (V, X_2)$, from the causal diagram, it may be shown that $$E(Y | X_1, X_2, V) = \beta_0 + \beta_1 + E(\in_1 | V) + E(\in_2 | X_2) + E(\beta_0 | V, X_2)$$

Result (2) can be proved similarly.

Remark 4. In some embodiments, there is no budget constraint on search content item spend. This implies that the scenario identified by FIG. 6 can be more common than the more complex one in FIG. 5. Practical models for the scenario of FIG. 5 may require careful consideration of lag effects in X2.

Remark 5. In some embodiments, (X1,V) does not satisfy the back-door criterion for X2→Y, since the path X2←consumer demand is not blocked. For example, X2 may represent social media content item spend. This suggests that the causal effect of X2 on sales cannot be estimated consistently by observations on (Y, X1, X2, V) only.

Remark 6. In some embodiments, if an additional variable can be collected so as to satisfy the back-door criterion for X2→Y, there is no guarantee that one can estimate the causal effects of X1 and X2 simultaneously from a single regression in traditional MMMs. If the two subsets of variables that satisfy the back-door criterion for X1→Y and X2→Y separately, are not the same, by regression against all relevant variables one may obtain uninterpretable results and even Simpson paradox, for example, by conditioning on unnecessary covariates, one may obtain negative impact for some media while the true impact is positive.

Figure 7:
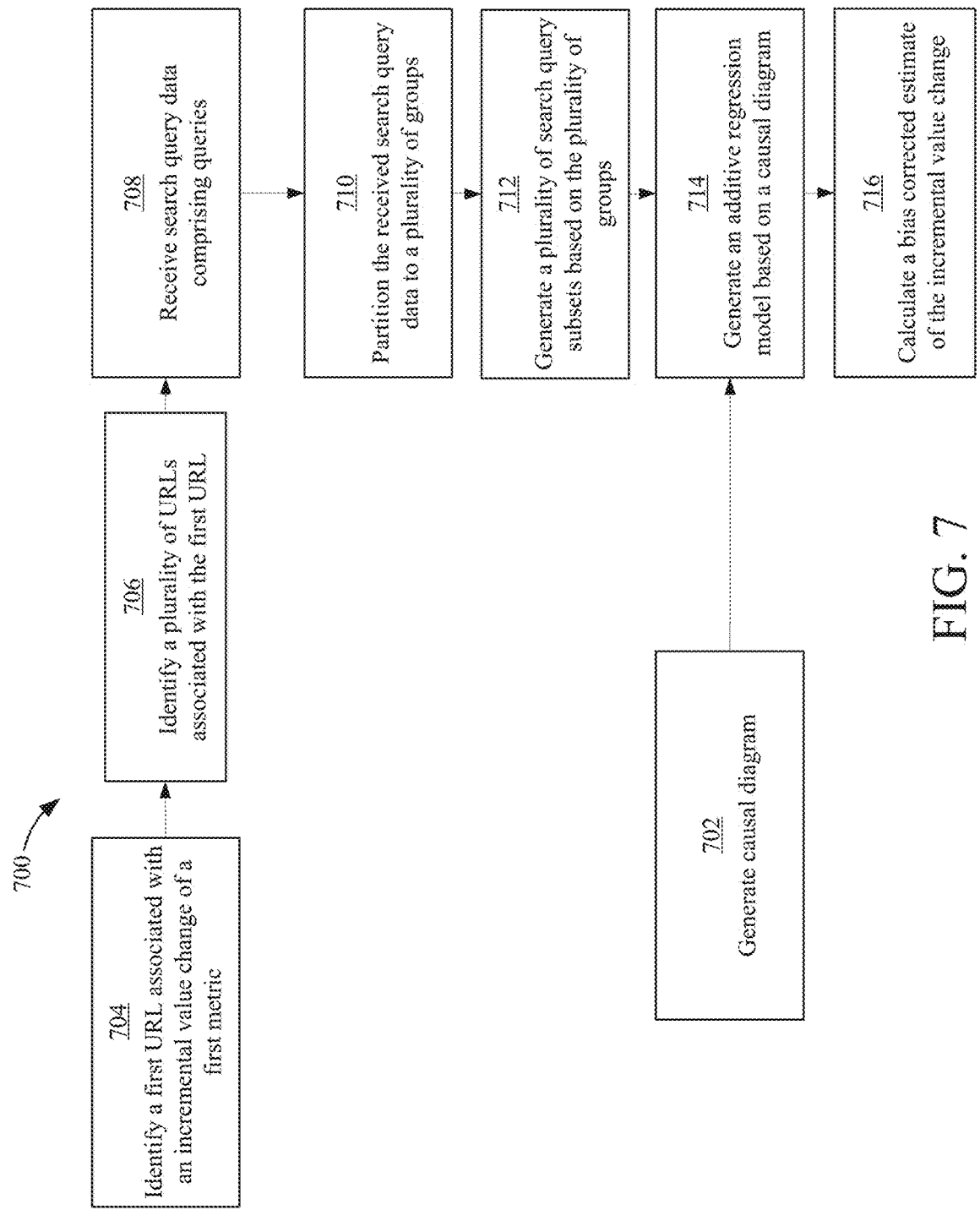
FIG. 7 is a flowchart of a process of eliminating bias in search results according to an example embodiment.

Referring to FIG. 7, a flow chart 700 of a process of eliminating bias in search results is illustrated according to an example embodiment. In brief, the process comprises identifying a first URL associated with an incremental value change of a first metric, identifying a plurality of URLs associated with the first URL, receiving search query data comprising queries, partition the received search query data to a plurality of groups, generating a plurality of search query subsets based on the plurality of the groups, generating an additive regression model based on a causal diagram, and calculating a bias corrected estimate of the incremental value change. The process may also comprise generating a causal diagram for use when generating an additive egression model based on the plurality of groups.

A causal diagram is generated at 702 in some embodiments. A causal diagram can be a directed acyclic graph (DAG), representing causal relationships between variables in a causal model. It comprises of a set of variables, represented as nodes of the graph, defined as being within the scope of the model. An arrow from node i to another node j represents causal in sequence from i to j, i.e. all other factors being equal, a change in i may cause changes in j.

A first URL associated with an incremental value change of a first metric is identified at 704. In some embodiments, V represents the volumes of relevant search queries that have potential impact on the sales of the product. The total number of relevant search queries is potentially very large, so it is important to summarize search queries in a way that can be used conveniently for model fitting. The summarization of V may not be straightforward, as the potential impact of each query term can be different. A first URL may be identified by identifying a content provider's website. In some embodiments, the content provider's top competitor's websites are also identified and its top competitors' websites.

A plurality of URLs associated with the first URL is identified at 706. In some embodiments, search query data comprising queries is received. For example, all queries associated with a target region, time window, demographic, and the like may be collected. For each query, the number of times each URL appears in the organic search results is counted (e.g., destination URLs). In some embodiments, if the set of URLs associated with the query contains the content provider's website, then the query is considered relevant to that content provider. Each relevant query in S may represent a different level of demand for the content provider's product.

The received search query data is partitioned to a plurality of groups at 710. In some embodiments, a relevant query set S is partitioned into three groups according to the mix of URLs that appear for each query. The destination URLs appearing in the organic results can also be classified into four groups: a) belongs to the content provider, b) belongs to top competitors, c) does not belong to the content provider or its competitors, but belongs to the business category, and d) does not belong to the business category.

For any query qi, the sum of the number of impressions for the URLs classified into each group can be denoted as wi,a, wi,b, wi,c and wi,d respectively. In some embodiments, wi,total=wi,a+wi,b+wi,c+wi,d be the total impressions for qi and wi,category=wi,a+wi,b+wi,c be the category impressions for qi.

A plurality of search query subsets based on the plurality of groups is generated at 712. In some embodiments if a number in the category over the number of queries in total is less than a pre-determined threshold, the queries are ignored as it is less likely to be relevant. Otherwise: if a target subset is greater than a pre-determined threshold, classify it as target-favoring, else if an associated competitor's subset is greater than a threshold, classify it as competitor-favoring, else classify it as general-interest. In some embodiments, this results in three subsets of queries, say, S1 containing all target-favoring queries, S2 containing all competitors-favoring queries, and S3 containing all general-interest queries. Given the three sets of queries S1, S2 and S3, the total number of searches for each query set can be counted in each time window t and labeled as V1t (target-favoring), V2t (competitors-favoring) and V3t (general-interest) correspondingly. The sum V1t+V2t+V3t can be designated category search volume at time window t. In some embodiments, 50% is a reasonable choice for the thresholds required for the above segmentation procedure.

An additive regression model based on a causal diagram is generated at 714. Implementation of the SBC method may rely on fitting the additive models identified by Theorem 1 and Theorem 2. For the simple scenario, in some embodiments, the function $f(V)$ is approximated as defined in Theorem 1 by an additive function, where V=(V1, V2, V3).

A bias corrected estimate of the incremental value change is calculated at 716. The bias corrected estimation of $\beta 1$ may be implemented by fitting an additive regression model. In some embodiments, the restricted maximum likelihood (REML) algorithm is used which reformulates the additive regression procedure as fitting a parametric mixed effect model.

In some embodiments, when the number of search queries is large enough, instead of approximating $f(V)$ by an additive function, one can approximate $f(V)$ directly by a 3-dimension full tensor product smooth and estimate $\beta 1$ by the regression below:

$$Y \sim \beta 0 + \beta 1 X + te(V1, V2, V3) \tag{5.2}$$

where te is the R function in MGCV to implement the full tensor product smooth.

In some embodiments, model stability can be checked by looking at results which replace $\beta 1 X$ by an unknown smooth function s(X), assumed to be monotonically increasing. The results were calculated based on marginal ROAS as below:

$$\hat{\beta}_1 = \sum\nolimits_t (s\hat{\,}((1+\delta)Xt) - s\hat{\,}(Xt))/(\delta \sum\nolimits_t Xt)$$

This is a non-parametric model fitting procedure. In some embodiments, marginal ROAS point estimates by this procedure are very much comparable to the estimates from model, 5.1.

For the purpose of comparison, the naive estimate fitted by OLS can also be calculated as follows:

$$Y \sim \beta 0 + \beta 1 X. \tag{5.3}$$

Consumer demand has a large impact on sales but it is hard to measure directly. Modelers sometimes use proxy variables to control for the underlying consumer demand. In some embodiments a demand-adjusted estimate is also included and is calculated by:

$$Y \sim \beta 0 + \beta 1 X + s(S) \tag{5.4}$$

where S stands for a consumer demand proxy variable. Category search volume may used for S.

For the complex scenario described by the causal diagram in FIG. 6 where there is no direct correlation between search content item spend and other media spend, it reduces to the simple scenario according to Theorem 2.

Figure 8:
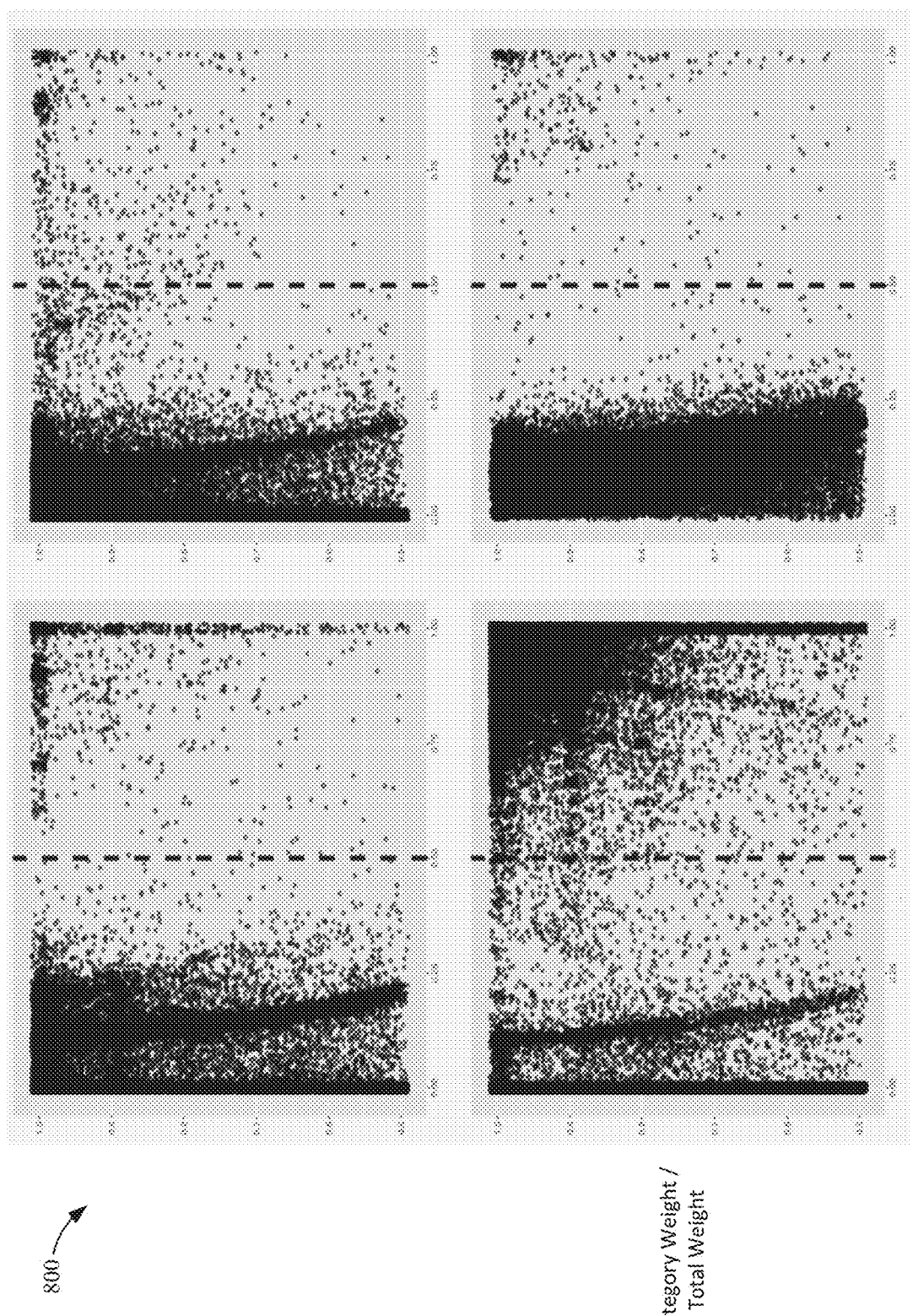
FIG. 8 is a set of charts illustrating search query classification according to an example embodiment.

Referring to FIG. 8, a set of charts 800 illustrating search query classification is illustrated according to an example embodiment. In the examples of search query classification, each dot is for a relevant query. The x-axis shows target_weight/category_weight and y-axis shows category_weight/total_weight. The queries on the right hand side of the vertical red line are grouped as target-favoring.

In some embodiments, the time series of sales, search ad.spend and search query volume (the target-favoring dimension), may be simulated from real data in the first case study below, where each time series is rescaled by its median value. The time series of each variable in each case follows a clear seasonality pattern, e.g. day of the week, and seasonal trends. In some embodiments data is kept private and the scale of each variable is not reported to keep data privacy, the scale of each variable is not reported, but some high level summary statistics are reported such as pairwise correlation and fitted model parameters. Also, in some embodiments, the experimental point estimate is scaled to equal one and all results and standard errors are indexed to that result.

Figure 9:
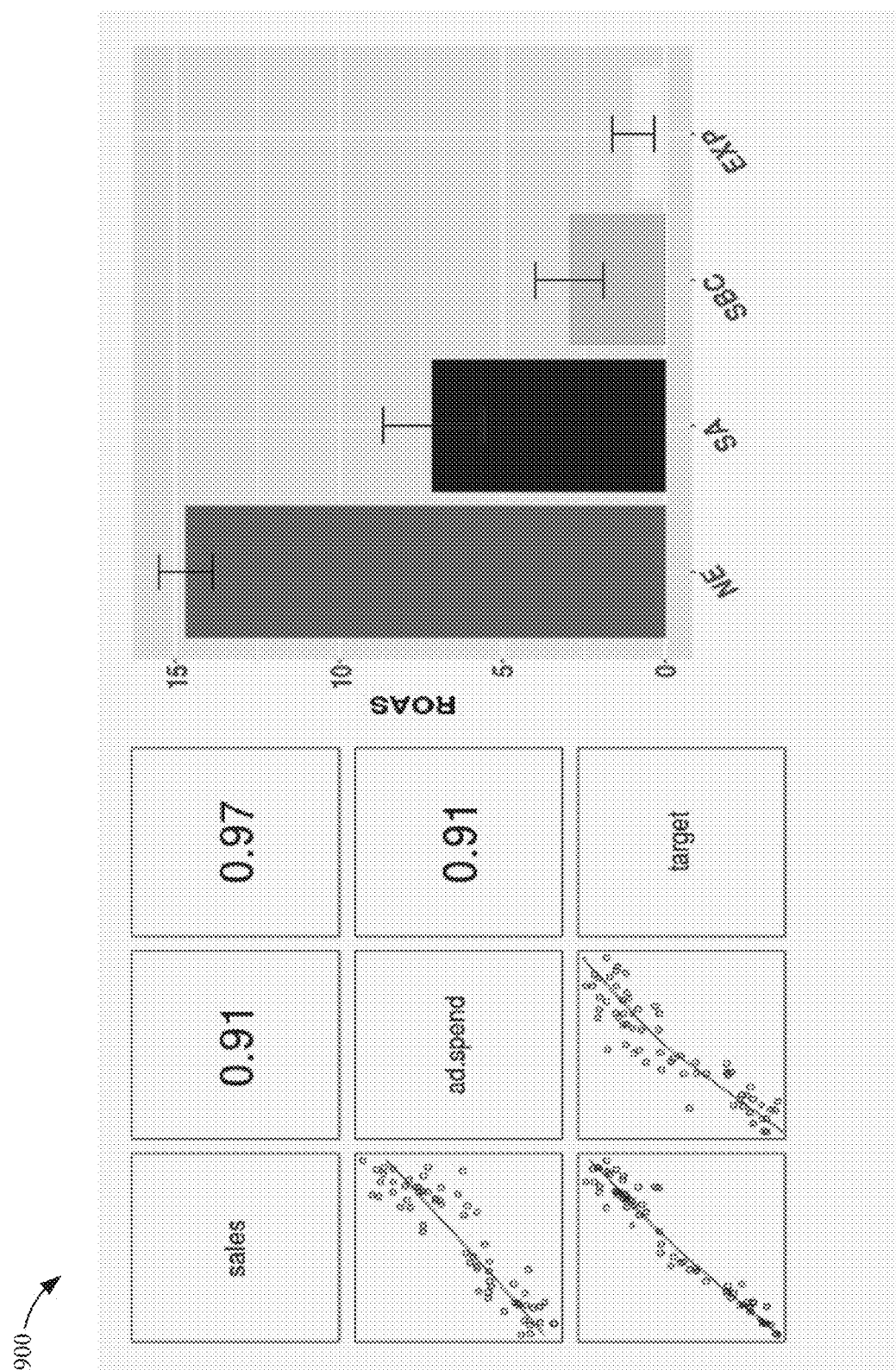
FIG. 9 is a scatter plot and a block diagram illustrating correlations between metrics and estimated ROAS for a first case study according to an example embodiment.
Figure 10:
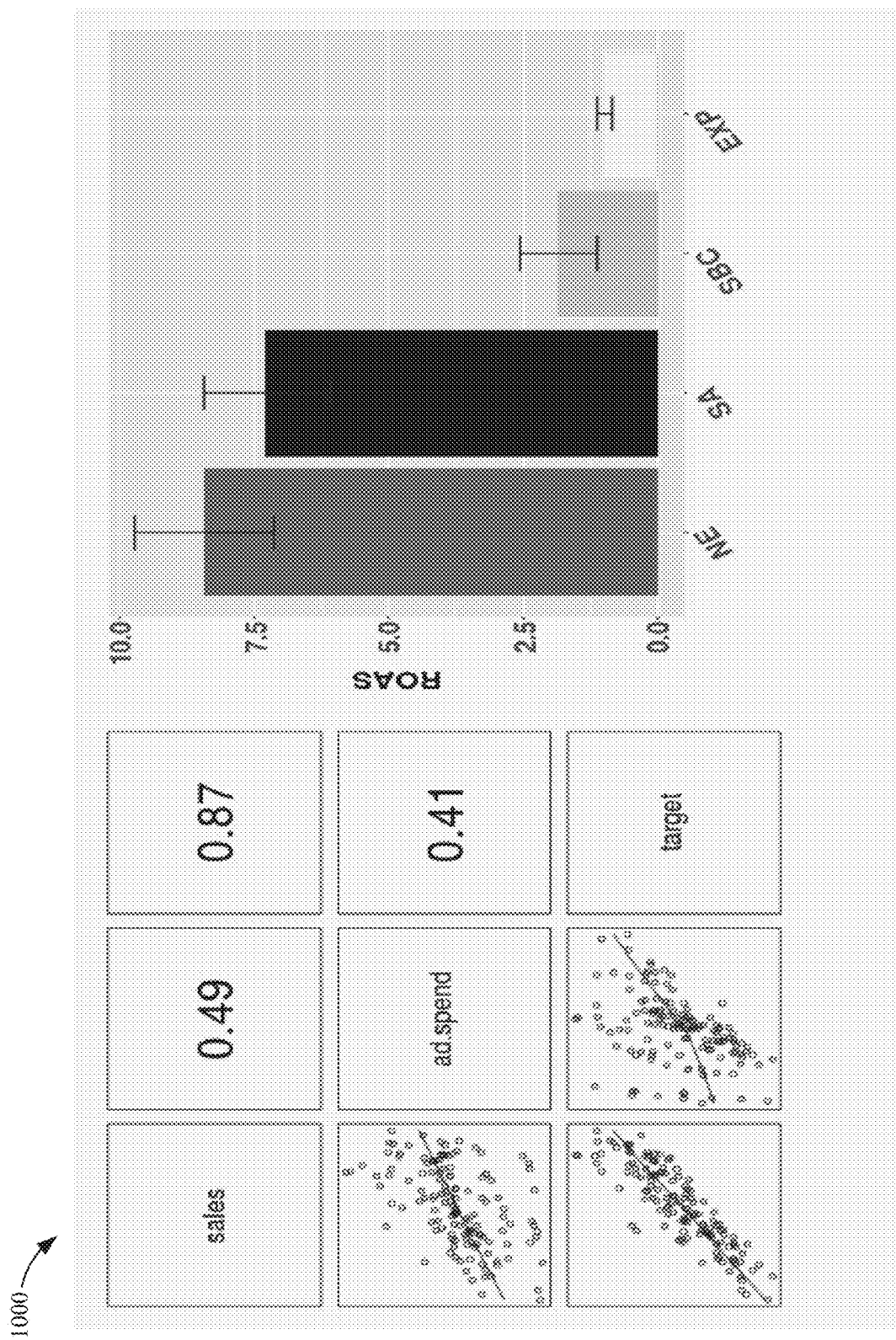
FIG. 10 is a scatter plot and a block diagram illustrating correlations between metrics and estimated ROAS for a second case study according to an example embodiment.
Figure 11:
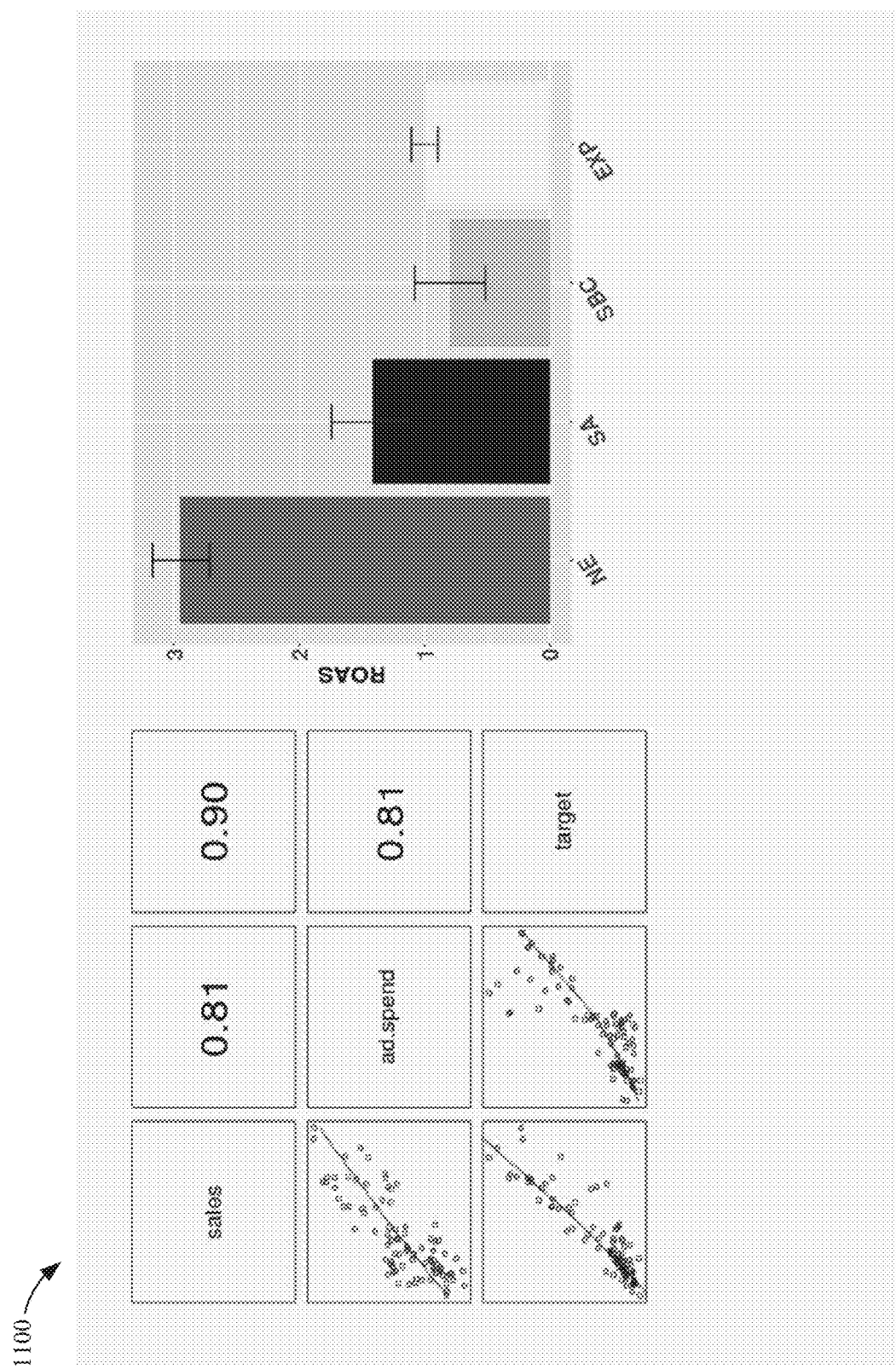
FIG. 11 is a scatter plot and a block diagram illustrating correlations between metrics and estimated ROAS for a third case study according to an example embodiment.

Referring to FIG. 9, a scatter plot and block diagram 900 illustrating correlations between metrics and an estimated ROAS for a first case study is illustrated according to an example embodiment. In this case, the content provider is a medium-size (with annual revenue of tens of millions of USD) e-commerce retailer and provides offline delivery of the product after receiving customers' orders online. Search advertising was the only major marketing channel, with no significant spend on other media channels. The data available in this example comprises y metrics of sales, content item spend and search query volumes for 65 days in 2015. The left panel in the top row of FIG. 6.2 shows the pairwise scatterplot, where the numbers on the upper panels are the Pearson correlation. For example, the correlation between ad.spend and sales is 0.91. A simple linear model with ad.spend may fit and predict sales well. The strong correlation (0.91) between target-favoring search query volume and content item spend in this case suggests that: 1) there may be strong content item targeting, and 2) the content provider rarely or never hits the top of their search content item budget. On the other hand, the correlation between search volume and sales is 0.97. In some embodiments SBC-SP is fitted as described in model (5.1): response $\sim \beta_0 + \beta_1 \times$ad.spend+s(target)+s(competitors)+s(general.interest) where target, competitors and general.interest represent target-favoring, competitor-favoring and general interest search query volumes separately. FIG. 9, FIG. 10, and FIG. 11 comprise scatter plots and correlations between search content item spend, target-favoring search volume and sales (Left panels) and estimated ROAS (Right panels) for the three case studies, where NE stands for the naive estimate and SA stands for the demand-adjusted estimate; EXP stands for the reference value from randomized geo experiments. The bar-lines show the values of $\hat{\beta}1 \pm \text{std.error}(\hat{\beta}1)$ (standard error). Both point estimates and standard errors are rescaled by the original EXP point estimate in order to preserve data privacy.

The point estimate of $\beta 1$ is 3.0 with standard error 1.02. The fitted smooth function for target-favoring query volume is monotonically increasing and almost linear (see FIG. 12). The adjusted R2 value is 0.95. The monotonicity is expected, but it is interesting to see the fitted curve from data directly without forcing monotonicity in any way. The fitted function for competitors-favoring search volume on the other hand is not statistically significant, while the one for general interest is statistically significant.

The naive estimate of $\beta 1$ based on OLS, model 5.3 is 14.7, with std.error 0.83. Using category search volume to control for seasonal demand, as in model 5.4, the fitted value is 7.1 with std.error 1.51. These two model fittings have adjusted R2 values of 0.83 and 0.90 respectively.

The content provider conducted the randomized geo experiments during the second month of the period. The indexed experimental estimate of ROAS has std.error 0.66. The naive estimate of ROAS is almost 15-fold larger than the experimental result. With the simple category-search-volume based demand adjustment, the gap shrinks but the estimate is still seven times as large. In contrast, the SBC estimate is much closer to the experimental result. See the comparison in FIG. 9.

Referring to FIG. 10, a scatter plot and block diagram 1000 illustrating correlations between metrics and an estimated ROAS for a second case study is illustrated according to an example embodiment. The content provider's business is, for example, a travel marketplace. The search content item spend, KPI, search query volumes data are illustrated on a daily basis over a period of about four months (135 days). A randomized experiment is shown in the last six weeks.

In this case, the demand adjustment does not reduce the bias much, bringing the estimated ROAS from 8.4 (with standard error 1.30) to 7.3 (with standard error 1.14). On the other hand, the SBC estimate is 1.9 with standard error 0.71, much closer to the experimental result with standard error 0.14. See the comparison in FIG. 10. The fitted smooth function for the target-favoring search volume again is monotonically increasing and almost linear. Like in FIG. 9, the competitors favoring search volume is not statistically significant, as shown in FIG. 10. It is noticeable that the correlation between target-favoring search volume and search content item spend is only 0.47, much lower than that in FIG. 9, but the strong correlation between sales and search volume may suggest that underlying consumer demand or organic search or both have contributed to sales dramatically in this case.

Referring to FIG. 11, a scatter plot and block diagram 1100 illustrating correlations between metrics and an estimated ROAS for a third case study is illustrated according to an example embodiment. The content provider is, for example, a national apparel retailer and the KPI is the number of visits to their website. The data covers about three months (88 days). A randomized experiment is shown in the last six weeks.

The SBC estimate of ROAS is 0.8 with standard error 0.28, the naive estimate is 2.9 with standard error 0.23, while the demand-adjusted estimate is 1.4 with standard error 0.33. See the graphical comparison in FIG. 11. In this case, the naive estimate is about three times larger than the experimental result. The demand adjusted estimate is about half of that, much closer to the experimental result. As in Cases 1 and 2, taking into account standard errors, the SBC estimate is again quite comparable to the experimental result. The fitted curve for target-favoring search query volume is again almost linear except steeper at the left end and the other two search dimensions have ignorable impact, as shown in FIG. 6.3(*c*).

Figure 12:
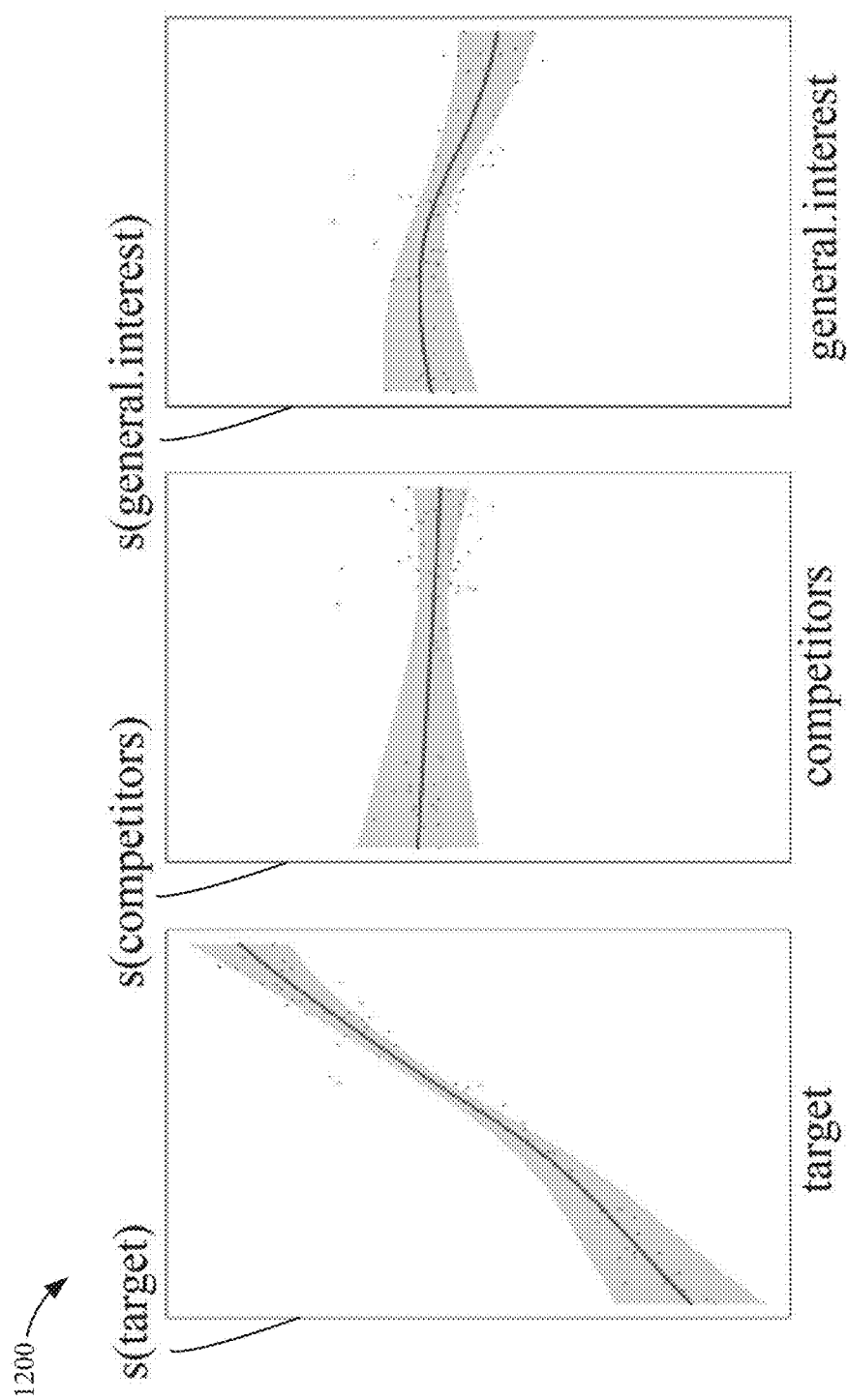
FIG. 12 is a scatter plot of a fitted function values plus model residuals illustrating selection bias for the first case study according to an example embodiment.
Figure 13:
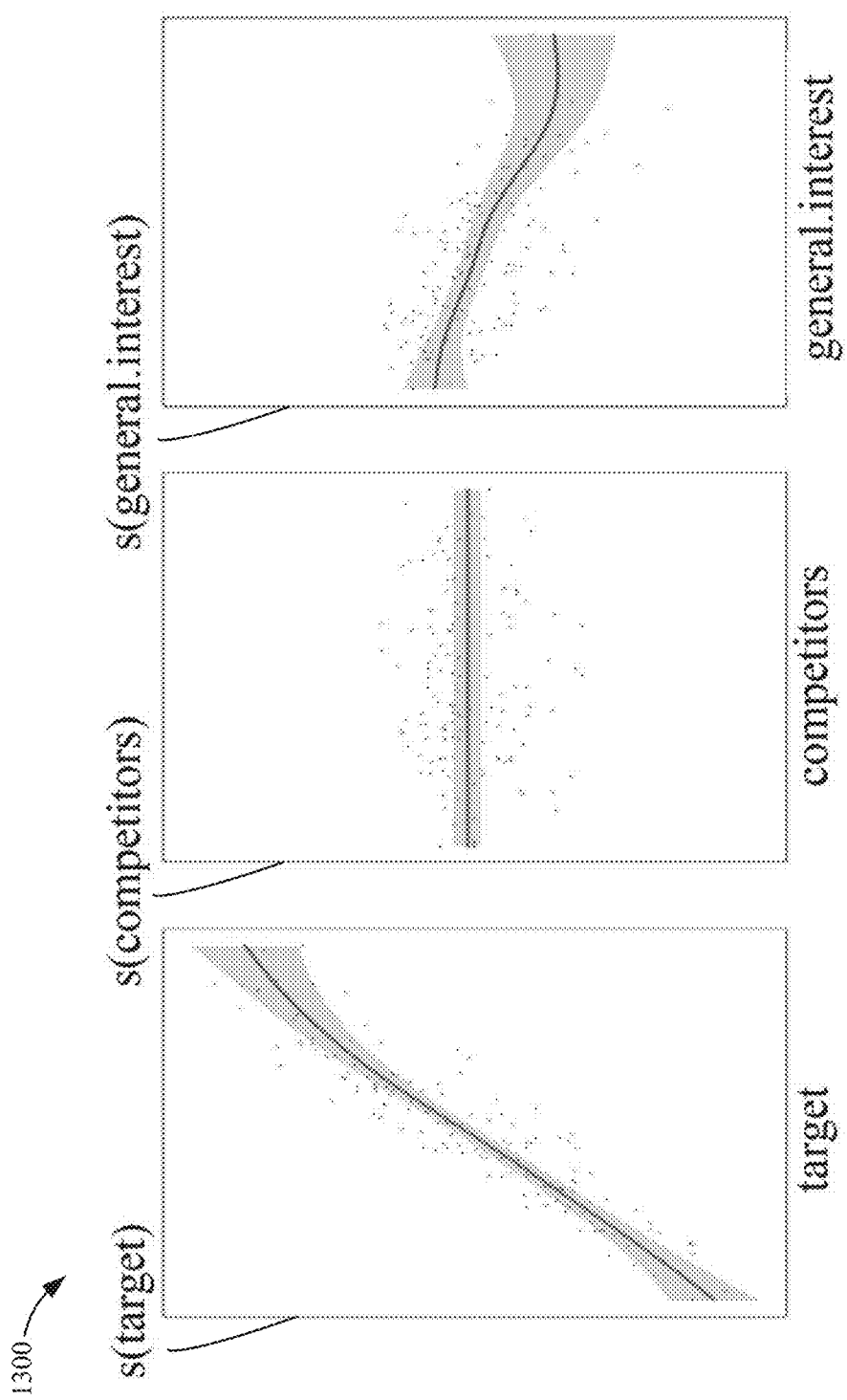
FIG. 13 is a scatter plot of a fitted function values plus model residuals illustrating selection bias for the second case study according to an example embodiment.
Figure 14:
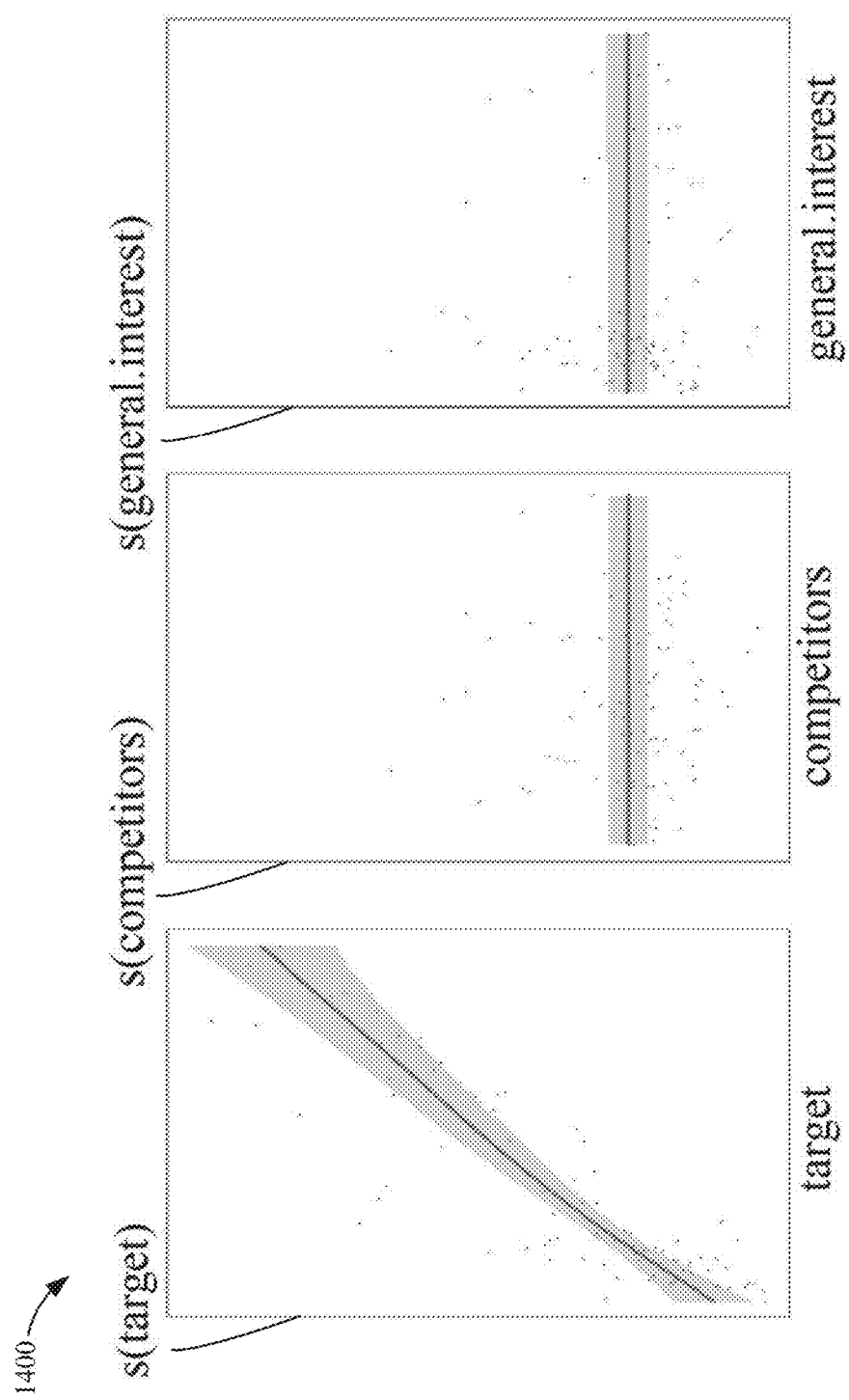
FIG. 14 is a scatter plot of a fitted function values plus model residuals illustrating selection bias for the third case study according to an example embodiment.

Referring to FIG. 12, a scatter plot 1200 of a fitted function values plus model residuals illustrating selection bias for the first case study is shown according to an example embodiment. Referring to FIG. 13, a scatter plot 1300 of a fitted function values plus model residuals illustrating selection bias for the second case study is shown according to an example embodiment. Referring to FIG. 14, a scatter plot 1400 of a fitted function values plus model residuals illustrating selection bias for the third case study is shown according to an example embodiment. In some embodiments, FIGS. 12-14 illustrate selection bias explained by changes of target-favoring, competitors-favoring and general interest search query volumes in the figures where the response curves and 95% confidence bands for the 3-*dim* (three dimensional) search query volumes are fitted in an additive function as described in the regression model, 5.1. The scatter plots are fitted function values plus model residuals.

Figure 15:
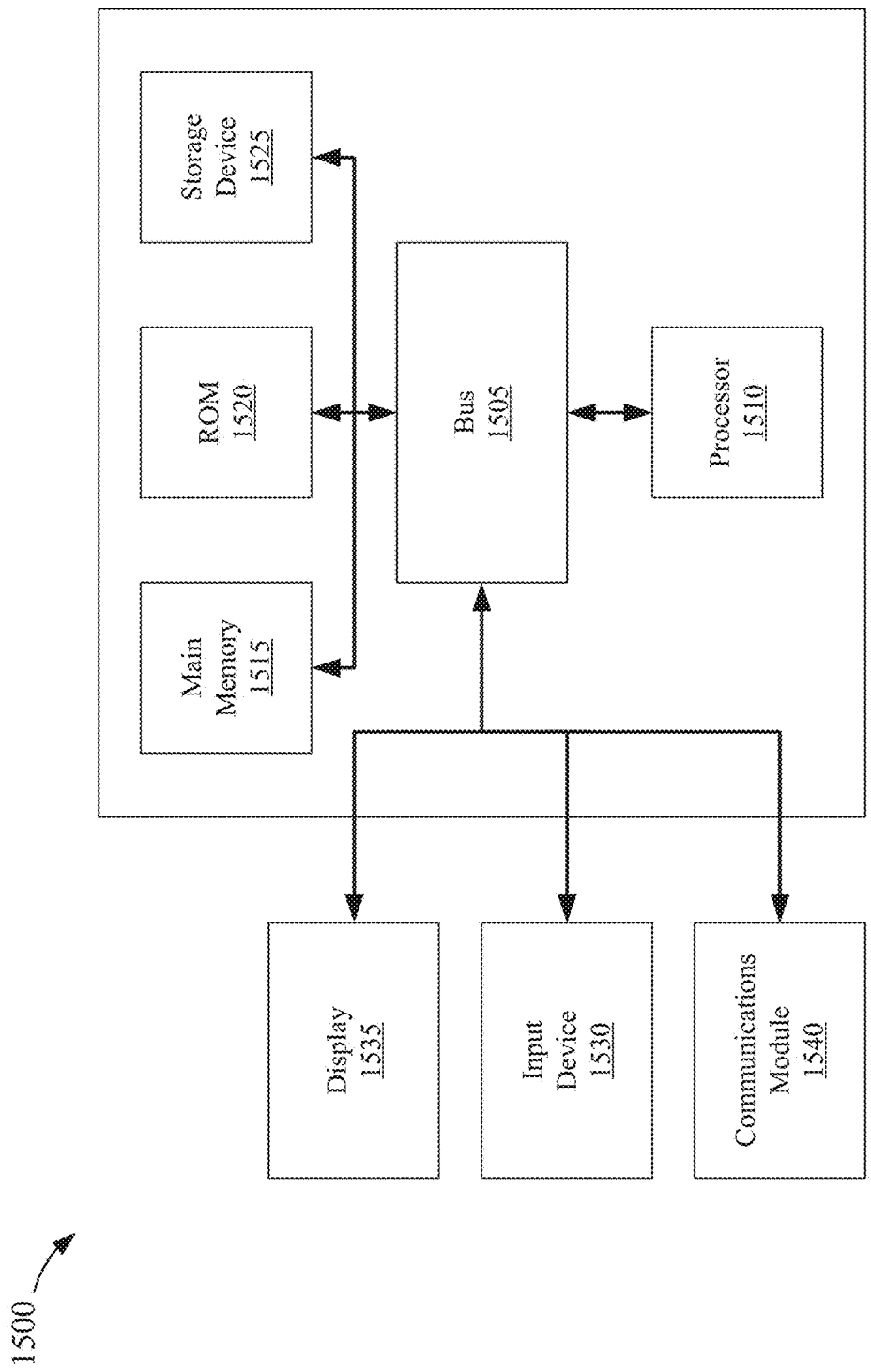
FIG. 15 is a block diagram of a computing system according to an illustrative embodiment.

Referring to FIG. 15, a block diagram of a computing system 1500 is shown according to an illustrative embodiment. FIG. 15 illustrates a depiction of a computing system 1500 that can be used, for example, to implement an illustrative user device 104, an illustrative content management system 108, an illustrative content provider device 106, an illustrative analysis system 150, and/or various other illustrative systems described in the present disclosure. The computing system 1500 includes a bus 1505 or other communication component for communicating information and a processor 1510 coupled to the bus 1505 for processing information. The computing system 1500 also includes main memory 1515, such as a random access memory (RAM) or other dynamic storage device, coupled to the bus 1505 for storing information, and instructions to be executed by the processor 1510. Main memory 1515 can also be used for storing position information, temporary variables, or other intermediate information during execution of instructions by the processor 1510. The computing system 1500 may further include a read only memory (ROM) 1510 or other static storage device coupled to the bus 1505 for storing static information and instructions for the processor 1510. A storage device 1525, such as a solid state device, magnetic disk or optical disk, is coupled to the bus 1505 for persistently storing information and instructions.

The computing system 1500 may be coupled via the bus 1505 to a display 1535, such as a liquid crystal display, or active matrix display, for displaying information to a user. An input device 1530, such as a keyboard including alphanumeric and other keys, may be coupled to the bus 1505 for communicating information, and command selections to the processor 1510. In another implementation, the input device 1530 has a touch screen display 1535. The input device 1530 can include a cursor control, such as a mouse, a trackball, or cursor direction keys, for communicating direction information and command selections to the processor 1510 and for controlling cursor movement on the display 1535.

In some implementations, the computing system 1500 may include a communications adapter 1540, such as a networking adapter. Communications adapter 1540 may be coupled to bus 1505 and may be configured to enable communications with a computing or communications network 1545 and/or other computing systems. In various illustrative implementations, any type of networking configuration may be achieved using communications adapter 1540, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 1500 in response to the processor 1510 executing an arrangement of instructions contained in main memory 1515. Such instructions can be read into main memory 1515 from another computer-readable medium, such as the storage device 1525. Execution of the arrangement of instructions contained in main memory 1515 causes the computing system 1500 to perform the illustrative processes described herein. One or more processors in a multi-processing arrangement may also be employed to execute the instructions contained in main memory 1515. In alternative implementations, hardwired circuitry may be used in place of or in combination with software instructions to implement illustrative implementations. Thus, implementations are not limited to any specific combination of hardware circuitry and software.

Although an example processing system has been described in FIG. 15, implementations of the subject matter and the functional operations described in this specification can be carried out using other types of digital electronic circuitry, or in computer software, firmware, or hardware, including the structures disclosed in this specification and their structural equivalents, or in combinations of one or more of them.

According to various implementations, the processes that effectuate illustrative implementations that are described herein can be achieved by the computing system 1500 in response to the processor 1510 executing an arrangement of instructions contained in main memory 1515. Such instructions can be read into main memory 1515 from another computer-readable medium, such as the storage device 1525. Execution of the arrangement of instructions contained in main memory 1515 causes the computing system 1500 to perform the illustrative processes described herein. One or more processors in a multi-processing arrangement may also be employed to execute the instructions contained in main memory 1515. In alternative implementations, hardwired circuitry may be used in place of or in combination with software instructions to implement illustrative implementations. Thus, implementations are not limited to any specific combination of hardware circuitry and software.

Although an example processing system has been described in FIG. 15, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TELEVISION channel, on a satellite TELEVISION channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying, by one or more processors, a first Uniform Resource Locator (URL) associated with an incremental value change of a first metric;
   identifying, by the one or more processors, a plurality of URLs associated with the first URL;
   receiving search query data comprising queries from a target geographical region in a first time window;
   partitioning, by the one or more processors, the received search query data to a plurality of groups comprising a first group associated with the first URL, a second group associated with one or more of the plurality of URLs, and a third group associated with a business category, each respective association defined by equaling or exceeding a predetermined threshold of a second metric;
   generating, by the one or more processors, a plurality of search query subsets based on the plurality of groups;
   generating, by the one or more processors, an additive regression model based on a causal diagram that comprises as identification of a causal effect associated with the incremental value change of the first metric; and
   calculating, by the one or more processors, a bias corrected estimate of the incremental value change of the first metric by fitting the additive regression model to the plurality of search query subsets.

2. The method of claim 1, further comprising:
   determining a first search term of the received search query data is associated with search results comprising the first URL;
   determining a second search term of the received search query data is associated with search results comprising one of the one or more plurality of URLs;
   partitioning, by the one or more processors, the first search term to the first group and the second search term to the second group.

3. The method of claim 1, further comprising:
   determining the first time window;
   calculating, by the one or more processors, a first number of searches in the first group, a second number of searches in the second group, and a third number of searches in the third group;
   calculating, by the one or more processors, a total search volume of the first group, the second group, and the third group; and
   determining at least one of the first number of searches in the first group, the second number of searches in the second group, and the third number of searches in the third group compared to the total search volume exceeds a second predetermined threshold.

4. The method of claim 1, further comprising:
   determining, a number of search queries in the received search query data exceeds a predetermined search query threshold; and
   generating the additive regression model using a 3-dimension full tensor product smooth consequent to determining the number of search queries in the received search query data exceeds the predetermined search query threshold.

5. The method of claim 1, wherein the first metric comprises a return on advertising spend.

6. The method of claim 1, further comprising reformulating the additive regression model using a restricted maximum likelihood (REML) algorithm.

7. The method of claim 1, wherein the search query data comprises all queries selected using at least one of a criteria selected from a group comprising the target geographical region, the time window, and a user demographic.

8. A system comprising:
   at least one computing device operably coupled to at least one memory and configured to:
   identify a first Uniform Resource Locator (URL) associated with an incremental value change of a first metric;
   identify a plurality of URLs associated with the first URL;
   receive search query data comprising queries from a target geographical region in a first time window;
   partition the received search query data to a plurality of groups comprising a first group associated with the first URL, a second group associated with one or more of the plurality of URLs, and a third group associated with a business category, each respective association defined by equaling or exceeding a predetermined threshold of a second metric;
   generate a plurality of search query subsets based on the plurality of groups;
   generate an additive regression model based on a causal diagram that comprises as identification of a causal effect associated with the incremental value change of the first metric; and
   calculate a bias corrected estimate of the incremental value change of the first metric by fitting the additive regression model to the plurality of search query subsets.

9. The system of claim 8, further comprising the at least one computing device configured to:
- determine a first search term of the received search query data is associated with search results comprising the first URL;
- determine a second search term of the received search query data is associated with search results comprising one of the one or more plurality of URLs;
- partition the first search term to the first group and the second search term to the second group.

10. The system of claim 8, further comprising the at least one computing device configured to:
- determine the first time window;
- calculate a first number of searches in the first group, a second number of searches in the second group, and a third number of searches in the third group; and
- calculate a total search volume of the first group, the second group, and the third group.

11. The system of claim 8, further comprising the at least one computing device configured to:
- determine, a number of search queries in the received search query data exceeds a predetermined number of search queries threshold; and
- generate the additive regression model using a 3-dimension full tensor product smooth consequent to determining the number of search queries in the received search query data exceeds the predetermined number of search queries threshold.

12. The system of claim 8, wherein the first metric comprises a return on ad spend.

13. The system of claim 8, further comprising the at least one computing device configured to reformulate the additive regression model using a restricted maximum likelihood (REML) algorithm.

14. The system of claim 8, wherein the search query data comprises all queries selected using at least one of a criteria selected from a group comprising the target geographical region, the time window, and a user demographic.

15. A non-transitory computer-readable media having computer-executable instructions embodied therein that, when executed by one or more processors of a computing system, cause the computing system to perform a process comprising:
- identifying a first content item;
- determining a media mix environment is associated with the first content item;
- determining a causal relationship between a first media of the media mix environment and a second media of the media mix environment;
- identifying a first Uniform Resource Locator (URL) associated with the first content item;
- identifying a plurality of URLs associated with the first URL;
- receiving search query data comprising queries from a target geographical region in a first time window;
- partitioning the received search query data to a plurality of groups comprising a first group associated with the first URL, a second group associated with one or more of the plurality of URLs, and a third group associated with a business category, each respective association defined by equaling or exceeding a predetermined threshold of a second metric;
- generating a plurality of search query subsets based on the plurality of groups;
- calculating a bias factor between the first media of the media mix environment and the second media of the media mix environment based on the causal relationship;
- generating an additive regression model using the bias factor between the first media of the media mix environment and the second media of the media mix environment; and
- calculating a bias corrected estimate of the incremental value change of the first metric by fitting the additive regression model to the plurality of search query subsets.

16. The media of claim 15, the process further comprising:
- determining a first search term of the received search query data is associated with search results comprising the first URL;
- determining a second search term of the received search query data is associated with search results comprising one of the one or more plurality of URLs;
- partitioning the first search term to the first group and the second search term to the second group.

17. The media of claim 15, the process further comprising:
- determining a first time window;
- calculating a first number of searches in the first group, a second number of searches in the second group, and a third number of searches in the third group; and
- calculating a total search volume of the first group, the second group, and the third group.

18. The media of claim 15, the process further comprising:
- determining a number of search queries in the received search query data exceeds a predetermined search query threshold; and
- generating the additive regression model using a 3-dimension full tensor product smooth consequent to determining the number of search queries in the received search query data exceeds the predetermined search query threshold.

19. The media of claim 15, the process further comprising reformulating the additive regression model using a restricted maximum likelihood (REML) algorithm.

20. The media of claim 15, wherein the search query data comprises all queries selected using at least one of a criteria selected from a group comprising a geographical target region, a time window, and a user demographic.

* * * * *